US008412024B2

(12) United States Patent

Ando et al.

(10) Patent No.: US 8,412,024 B2
(45) Date of Patent: *Apr. 2, 2013

(54) INFORMATION RECORDING METHOD, INFORMATION RECORDING MEDIUM, AND INFORMATION REPRODUCING METHOD, WHEREIN INFORMATION IS STORED ON A DATA RECORDING PORTION AND A MANAGEMENT INFORMATION RECORDING PORTION

(75) Inventors: Hideo Ando, Tokyo (JP); Hiroaki Unno, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 929 days.

This patent is subject to a terminal disclaimer.

(21) Appl. No.: 12/504,372

(22) Filed: Jul. 16, 2009

(65) Prior Publication Data

US 2009/0274443 A1 Nov. 5, 2009

Related U.S. Application Data

(62) Division of application No. 11/505,304, filed on Aug. 17, 2006, now Pat. No. 7,606,467, which is a division of application No. 10/195,789, filed on Jul. 16, 2002, now Pat. No. 7,362,953, which is a division of application No. 09/651,295, filed on Aug. 30, 2000, now Pat. No. 6,529,681, which is a division of application No. 09/311,272, filed on May 14, 1999, now Pat. No. 6,341,196.

(30) Foreign Application Priority Data

May 15, 1998 (JP) .................................... 10-133832

(51) Int. Cl.
*H04N 9/80* (2006.01)

(52) U.S. Cl. ...................................................... 386/241

(58) Field of Classification Search ........................ None
See application file for complete search history.

(56) References Cited

U.S. PATENT DOCUMENTS 4,797,752 A 1/1989 Giddings
5,333,315 A * 7/1994 Saether et al. ........................ 1/1
(Continued)

FOREIGN PATENT DOCUMENTS

JP 58-088978 5/1983
JP 58-88978 5/1983
(Continued)

OTHER PUBLICATIONS

Explanation of Circumstances concerning Accelerated Examination for Japanese Patent Application No. 1998-133832 (with English translation).

*Primary Examiner* — Huy T Nguyen

(74) *Attorney, Agent, or Firm* — Oblon, Spivak, McClelland, Maier & Neustadt, L.L.P.

(57) ABSTRACT

With this invention, at least one of a video file containing video information, a still picture file containing still picture information, and an audio file containing audio information and a management file having management information on a control method of reproducing the information in the file are recorded on an information storage medium. This realizes a data structure that causes the recording and deleting places on the information storage medium to correspond spuriously to places on a single tape, such as a VTR tape. Use of the data structure provides users with an easy-to-use interface.

4 Claims, 32 Drawing Sheets

U.S. PATENT DOCUMENTS

| | | | | | |
|---|---|---|---|---|---|
| 5,636,200 | A | * | 6/1997 | Taira et al. | 369/275.3 |
| 5,745,643 | A | | 4/1998 | Mishina | |
| 5,778,142 | A | | 7/1998 | Taira et al. | |
| 5,915,067 | A | | 6/1999 | Nonomura et al. | |
| 5,999,696 | A | | 12/1999 | Tsuga et al. | |
| 5,999,698 | A | | 12/1999 | Nakai et al. | |
| 6,088,507 | A | | 7/2000 | Yamauchi et al. | |
| 6,094,414 | A | | 7/2000 | Taira et al. | |
| 6,112,011 | A | | 8/2000 | Hisatomi | |
| 6,181,870 | B1 | | 1/2001 | Okada et al. | |
| 6,198,874 | B1 | | 3/2001 | Kaneshige et al. | |
| 6,212,330 | B1 | | 4/2001 | Yamamoto et al. | |
| 6,222,806 | B1 | | 4/2001 | Mori et al. | |
| 6,308,005 | B1 | | 10/2001 | Ando et al. | |
| 6,317,809 | B1 | | 11/2001 | Kulakowski et al. | |
| 6,339,674 | B1 | | 1/2002 | Ando et al. | |
| 6,341,196 | B1 | | 1/2002 | Ando et al. | |
| 6,490,683 | B1 | * | 12/2002 | Yamada et al. | 713/176 |
| 6,529,681 | B1 | | 3/2003 | Ando et al. | |
| 6,697,565 | B2 | | 2/2004 | Ando et al. | |
| 6,915,066 | B2 | | 7/2005 | Ando et al. | |
| 7,155,112 | B2 | * | 12/2006 | Uno et al. | 386/248 |

FOREIGN PATENT DOCUMENTS

| | | |
|---|---|---|
| JP | 60-236163 | 11/1985 |
| JP | 2-206820 | 8/1990 |
| JP | 02-206820 | 8/1990 |
| JP | 06-103577 | 4/1994 |
| JP | 6-223504 | 8/1994 |
| JP | 8-263969 | 10/1996 |
| JP | 8-315551 | 11/1996 |
| JP | 08-320945 | 12/1996 |
| JP | 9-135412 | 5/1997 |
| JP | 09-259574 | 10/1997 |
| JP | 10-003778 | 1/1998 |
| JP | 10-112166 | 4/1998 |
| JP | 11-162119 | 6/1999 |
| JP | 11-238318 | 8/1999 |
| JP | 3898751 | 3/2007 |
| WO | WO 98/14938 | 4/1998 |

* cited by examiner

PGC INFORMATION

| PGC #1 | | PGC #2 | | PGC #3 | |
|---|---|---|---|---|---|
| NO. OF CELLS=3 | | NO. OF CELLS=3 | | NO. OF CELLS=5 | |
| CELL #1 | CELL A | CELL #1 | CELL D | CELL #1 | CELL E |
| CELL #2 | CELL B | CELL #2 | CELL E | CELL #2 | CELL A |
| CELL #3 | CELL C | CELL #3 | CELL F | CELL #3 | CELL D |
| —— | —— | —— | —— | CELL #4 | CELL B |
| —— | —— | —— | —— | CELL #5 | CELL E |

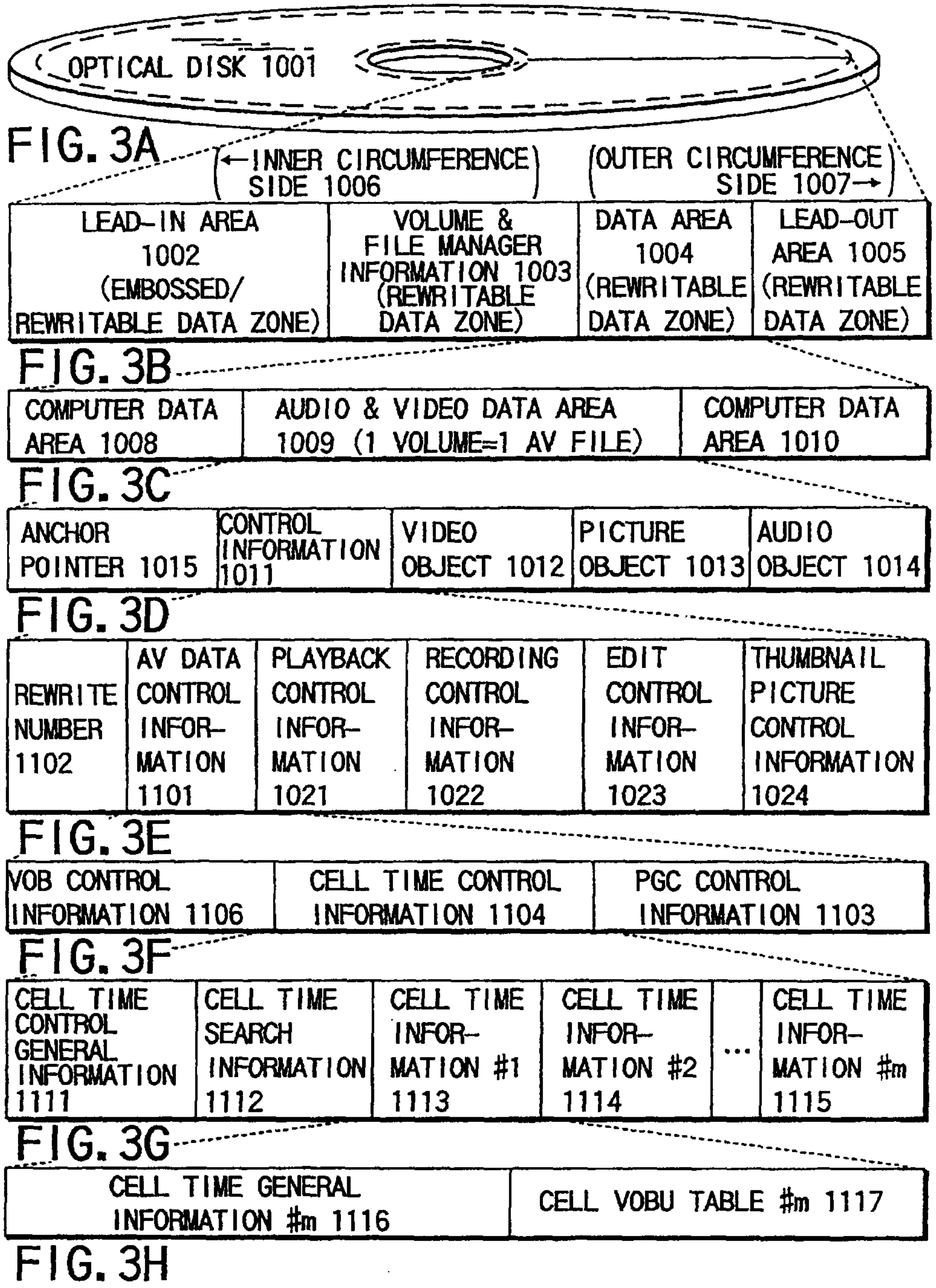
OPTICAL DISK 1001
FIG. 3A
←INNER CIRCUMFERENCE SIDE 1006
OUTER CIRCUMFERENCE SIDE 1007→
LEAD-IN AREA 1002 (EMBOSSED/ REWRITABLE DATA ZONE)
VOLUME & FILE MANAGER INFORMATION 1003 (REWRITABLE DATA ZONE)
DATA AREA 1004 (REWRITABLE DATA ZONE)
LEAD-OUT AREA 1005 (REWRITABLE DATA ZONE)
FIG. 3B
COMPUTER DATA AREA 1008
AUDIO & VIDEO DATA AREA 1009 (1 VOLUME=1 AV FILE)
COMPUTER DATA AREA 1010
FIG. 3C
ANCHOR POINTER 1015
CONTROL INFORMATION 1011
VIDEO OBJECT 1012
PICTURE OBJECT 1013
AUDIO OBJECT 1014
FIG. 3D
REWRITE NUMBER 1102
AV DATA CONTROL INFOR-MATION 1101
PLAYBACK CONTROL INFOR-MATION 1021
RECORDING CONTROL INFOR-MATION 1022
EDIT CONTROL INFOR-MATION 1023
THUMBNAIL PICTURE CONTROL INFORMATION 1024
FIG. 3E
VOB CONTROL INFORMATION 1106
CELL TIME CONTROL INFORMATION 1104
PGC CONTROL INFORMATION 1103
FIG. 3F
CELL TIME CONTROL GENERAL INFORMATION 1111
CELL TIME SEARCH INFORMATION 1112
CELL TIME INFOR-MATION #1 1113
CELL TIME INFOR-MATION #2 1114
...
CELL TIME INFOR-MATION #m 1115
FIG. 3G
CELL TIME GENERAL INFORMATION #m 1116
CELL VOBU TABLE #m 1117
FIG. 3H

FIG. 10A

PLAYBACK DATA

| VOB_IDN #1 | | | VOB_IDN #3 | | VOB_IDN #2 | |
|---|---|---|---|---|---|---|
| CELL A | CELL B | CELL C | CELL F | CELL G | CELL D | CELL E |

FIG. 10B

PGC INFORMATION

PGC #1

| PLAYBACK SEQUENCE | RELEVANT CELL |
|---|---|
| NO. OF CELLS=7 | |
| 1 | CELL A |
| 2 | CELL B |
| 3 | CELL C |
| 4 | CELL D |
| 5 | CELL E |
| 6 | CELL F |
| 7 | CELL G |

| LSN | LBN | STRUCTURE 411 | DESCRIPTOR 442 | CONTENTS 443 |
|---|---|---|---|---|
| 0–15 | | | RESERVED 459 (00h BYTES ALL) | |
| 16 | | VOLUME RECOGNITION SEQUENCE 444 | BEGINNING EXTENT AREA DESCRIPTOR 445 | VRS START POSITION |
| 17 | | | VOLUME STRUCTURE DESCRIPTOR 446 | DISC CONTENT DESCRIPTION |
| 18 | | | BOOT DESCRIPTOR 447 | BOOT START POSITION |
| 19 | | | TERMINATING EXTENT AREA DESCRIPTOR 448 | VRS END POSITION |
| ~31 | | | RESERVED 460 (00h BYTES ALL) | |
| 32~ | | MAIN VOLUME DESCRIPTOR SEQUENCE 449 | ... | |
| 34 | | | PARTITION DESCRIPTOR 450<br>PARTITION CONTENT USE 451<br>UNALLOCATED SPACE TABLE 452<br>AD(50)<br>UNALLOCATED SPACE BIT MAP 453<br>AD(0) | RECORDED POSITION OF SPACE TABLE<br>RECORDED POSITION OF SPACE BIT MAP |
| 35 | | | LOGICAL VOLUME DESCRIPTOR 454<br>LOGICAL VOLUME CONTENT USE 455<br>LAD(100) | RECORDED POSITION OF FILE SET DESCRIPTOR |
| | | | | |

FIG. 12A

| | | | | |
|---|---|---|---|---|
| | | | | |
| ~47 | | | ... | |
| ~63 | | | ... | |
| -255 | | | RESERVED 461(00h BYTES ALL) | |
| 256 | | FIRST ANCHOR POINT 456 | ANCHOR VOLUME DESCRIPTOR POINTER 458 | |
| -271 | | | RESERVED 462(00h BYTES ALL) | |
| 272 ~ 321 | 0 ~ 49 | FILE STRUCTURE 486 | SPACE BIT MAP DESCRIPTOR 470 | MAPPING OF RECORDING/UNRECORDING OF SPACE BIT MAP |
| 322 ~ 371 | 50 ~ 99 | | USE(AD(*),AD(*),···,AD(*)) 471 | EXTENT LIST OF UNRECORDED STATE OF SPACE TABLE |
| 372 | 100 | | FILE SET DESCRIPTOR 472<br>ROOT DIRECTORY ICB 473<br>LAD(102) 474 | RECORDED POSITION OF FE OF ROOT DIRECTORY |
| 373 | 101 | | ... | |
| 374 | 102 | | ROOT DIRECTORY AFE(AD(103)) 475 | FIDs RECORDED POSITION |
| | | | | |

FIG. 12B

| | | | | |
|---|---|---|---|---|
| 375 | 103 | FILE STRUCTURE 486 | A FID(LAD(104),LAD(110)) 476 | B,D:FE POSITION |
| 376 | 104 | | PARENT DIRECTORY BFE(AD(105)) 477 | FIDs RECORDED POSITION |
| 377 | 105 | | FID(LAD(106)) OF B 478 | FE POSITION OF C |
| 378 | 106 | | FE(AD(107)AD(108)AD(109)) 479 | FILE DATA POSITION |
| 382 | 110 | | DIRECTORY D FE(AD(111)) 480 | FIDs RECORDED POSITION |
| 383 | 111 | | D FID(LAD(112), LAD(NONE) 481 | E,F:FE POSITION |
| 384 | 112 | | SUBDIRECTORY F FE(AD(113)) 482 | FIDs RECORDED POSITION |
| 385 | 113 | | FID(LAD()LAD(114)LAD(118)) 483 | H,I:FE POSITION |
| 386 | 114 | | FE(AD(115)AD(116)AD(117)) 484 | FILE DATA POSITION |
| 390 | 118 | | I FE(AD(119),AD(120)) 485 | FILE DATA POSITION |
| 379- | 107- | FILE DATA 487 | INFORMATION ON FILE DATA C 488 | |
| 387- | 115- | | INFORMATION ON FILE DATA H 489 | |
| 391- | 119- | | INFORMATION ON FILE DATA I 490 | |

FIG. 13A

| | | | |
|---|---|---|---|
| LLSN-271 ~ LLSN-257 | | RESERVED 463 (00h BYTES ALL) | |
| LLSN -256 | SECOND ANCHOR POINT 457 | ANCHOR VOLUME DESCRIPTOR POINTER 458 | |
| LLSN-255 ~ LLSN-224 | | RESERVED 464 (00h BYTES ALL) | |
| LLSN -223 ~ LLSN -208 | RESERVED VOLUME DESCRIPTOR SEQUENCE 467 | PARTITION DESCRIPTOR 450<br>PARTITION CONTENT USE 451<br>UNALLOCATED SPACE TABLE 452<br>UNALLOCATED SPACE BIT MAP 453<br>LOGICAL VOLUME DESCRIPTOR 454<br>LOGICAL VOLUME CONTENT USE 455 | BACKUP OF MAIN VOLUME DESCRIPTOR SEQUENCE |
| LLSN-207 ~LLSN | | RESERVED 465 (00h BYTES ALL) | |

*LSN···LOGICAL SECTOR NUMBER 491
*LBN···LOGICAL BLOCK NUMBER 492
*LLSN···LAST LOGICAL SECTOR NUMBER (LAST LSN) 493
*IT IS QUITE UNUSUAL THAT SPACE BIT MAP AND SPACE TABLE ARE RECORDED TOGETHER. USUALLY, EITHER SPACE BIT MAP OR SPACE TABLE IS RECORDED

FIG. 13B

FID(LAD(LOGICAL BLOCK NUMBER))
···INDICATES INFORMATION ON FILE
(INCLUDING ROOT DIRECTORY, SUBDIRECTORY, AND FILE DATA)
||

| | | | | |
|---|---|---|---|---|
| DESCRIPTOR TAG (≡257), IDENTIFIER FOR THE CONTENTS OF DESCRIPTION 421 [16 BYTES] | FILE CHARACTERISTICS INDICATING TYPE OF FILE 422 [1 BYTE] | INFORMATION CONTROL BLOCK INDICATING THE RECORDED POSITION OF CORRESPONDING FE 423 (LAD(*)) | EITHER FILE IDENTIFIER DIRECTORY NAME OR FILE DATA NAME 424 | PADDING DUMMY AREA (000h) 437 |

*FILE CHARACTERISTICS (FILE TYPE) INDICATES ONE OF PARENT DIRECTORY, DIRECTORY, FILE DATA, AND FILE DELETE FLAG

FIG. 15

AD (LOGICAL BLOCK NUMBER) · · · METHOD OF WRITING THE POSITION OF EXTENT ON INFORMATION STORAGE MEDIUM
||

| | |
|---|---|
| LENGTH OF EXTENT 410 (NO. OF LOGICAL BLOCKS) [EXPRESSED IN 4 BYTES] | POSITION OF EXTENT 411 (LOGICAL BLOCK NUMBER) [EXPRESSED IN 4 BYTES] |

FIG. 17

FE(AD(*), AD(*), ····, AD(*))
···INDICATES THE RECORDED POSITION ON INFORMATION STORAGE MEDIUM OF A FILE SPECIFIED BY FID IN HIERARCHICAL FILE STRUCTURE

||

| | | | |
|---|---|---|---|
| DESCRIPTOR TAG (≡261), IDENTIFIER FOR THE CONTENTS OF DESCRIPTION 417 [16 BYTES] | ICB TAG INDICTING TYPE OF FILE (TYPE=4/5) 418 [20 BYTES] | PERMISSION, INFORMATION TO PERMIT RECORDING, PLAYBACK, OR DELETING FOR EACH USER 419 [32 BYTES] | ALLOCATION DESCRIPTOR, DESCRIBING THE RECORDED POSITIONS OF FILES SIDE BY SIDE ON INFORMATION STORAGE MEDIUM (LOGICAL BLOCK NUMBERS ON INFORMATION STORAGE MEDIUM) (AD(*), AD(*), ····, AD(*)) 420 |

*FILE TYPE IN ICB TAG=1 MEANS UNALLOCATED SPACE ENTRY
*FILE TYPE IN ICB TAG=4 MEANS DIRECTORY
*FILE TYPE IN ICB TAG=5 MEANS FILE DATA

FIG. 16

| DATA AREA ON INFORMATION STORAGE MEDIUM 1004 | | | | | |
|---|---|---|---|---|---|
| UN-RECORDED AREA | PC FILE | UN-RECORDED AREA | VIDEO FILE #1 | PC FILE | UN-RECORDED AREA |

LBN  A      B       C       D       E       F       G

FILE ENTRY OF PC FILE            ··· FE(AD(A)) AND FE(AD(F))

FILE ENTRY OF VIDEO FILE #1   ··· FE(AD(C))

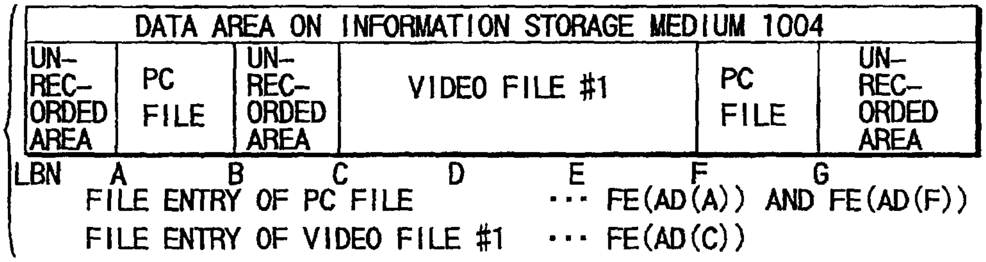

FIG. 18A

| DATA AREA ON INFORMATION STORAGE MEDIUM 1004 | | | | | | | |
|---|---|---|---|---|---|---|---|
| UN-RECORDED AREA | PC FILE #1 | UN-RECORDED AREA | VIDEO FILE #1 | UN-RECORDED AREA | VIDEO FILE #1 | PC FILE #2 | UN-RECORDED AREA |

LBN  A      B       C       D       E       F       G

FILE ENTRY OF PC FILE            ··· FE(AD(A)) AND FE(AD(F))

FILE ENTRY OF VIDEO FILE #1   ··· FE(AD(C),AD(E))

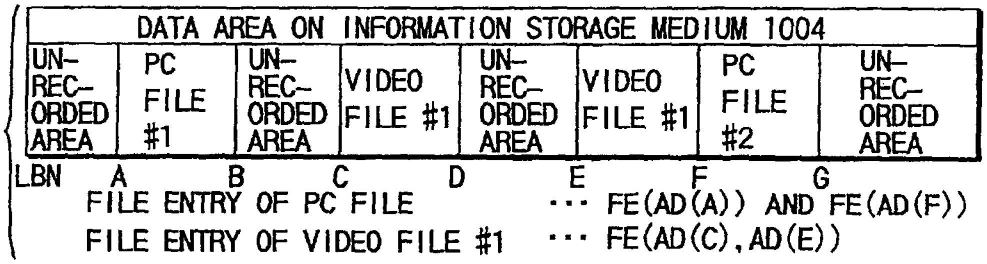

FIG. 18B

| DATA AREA ON INFORMATION STORAGE MEDIUM 1004 | | | | | | | |
|---|---|---|---|---|---|---|---|
| UN-RECORDED AREA | PC FILE #1 | UN-RECORDED AREA | VIDEO FILE #1 | PC FILE #3 | VIDEO FILE #1 | PC FILE #2 | UN-RECORDED AREA |

LBN  A      B       C       D       E       F       G

FILE ENTRY OF PC FILE            ··· FE(AD(A)), FE(AD(D)) AND FE(AD(F))

FILE ENTRY OF VIDEO FILE #1   ··· FE(AD(C),AD(E))

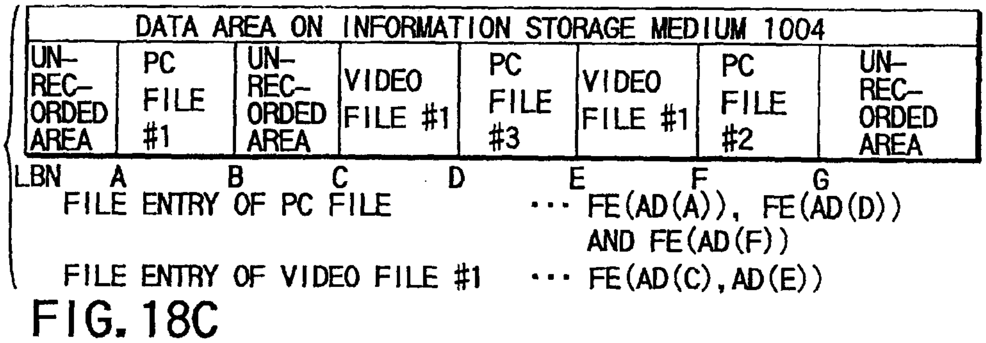

FIG. 18C

| DATA AREA ON INFORMATION STORAGE MEDIUM 1004 | | | | | | | |
|---|---|---|---|---|---|---|---|
| UN-RECORDED AREA | PC FILE #1 | UN-RECORDED AREA | VIDEO FILE #1 | PC FILE #3 | VIDEO FILE #1 | PC FILE #2 | VIDEO FILE #2 |

LBN  A      B       C       D       E       F       G

FILE ENTRY OF PC FILE            ··· FE(AD(A)), FE(AD(D)) AND FE(AD(F))

FILE ENTRY OF VIDEO FILE #1   ··· FE(AD(C),AD(E))

FILE ENTRY OF VIDEO FILE #2   ··· FE(AD(G))

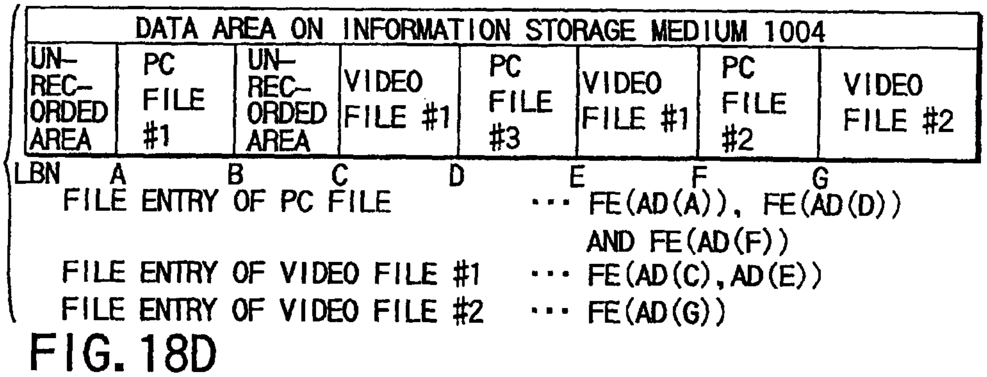

FIG. 18D

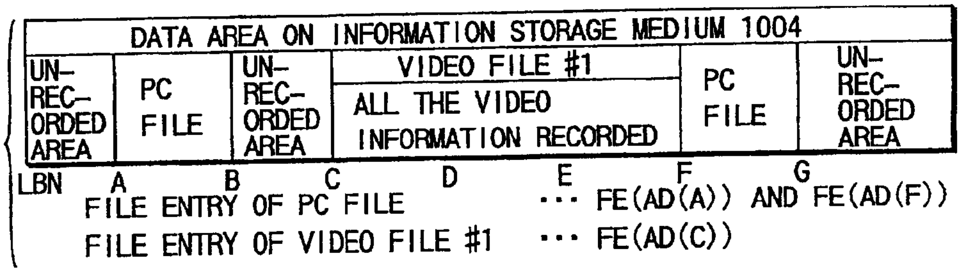

FIG. 19A

| DATA AREA ON INFORMATION STORAGE MEDIUM 1004 | | | | | | |
|---|---|---|---|---|---|---|
| UN-REC-ORDED AREA | PC FILE | UN-REC-ORDED AREA | VIDEO FILE #1 ALL THE VIDEO INFORMATION RECORDED | | PC FILE | UN-REC-ORDED AREA |

LBN  A     B     C     D     E     F     G

FILE ENTRY OF PC FILE          ... FE(AD(A)) AND FE(AD(F))
FILE ENTRY OF VIDEO FILE #1    ... FE(AD(C))

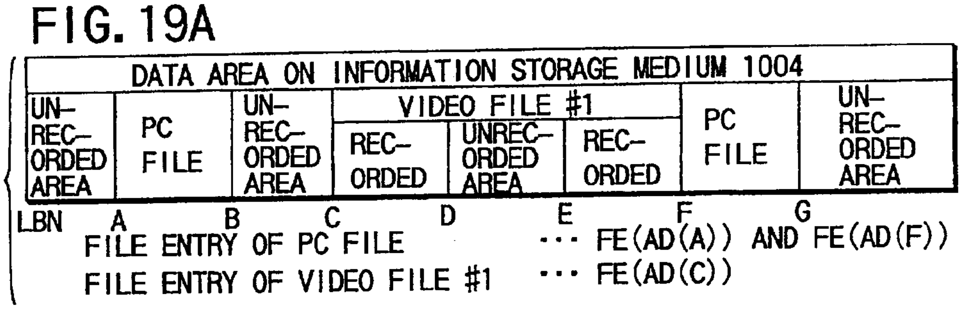

FIG. 19B

| DATA AREA ON INFORMATION STORAGE MEDIUM 1004 | | | | | | | |
|---|---|---|---|---|---|---|---|
| UN-REC-ORDED AREA | PC FILE | UN-REC-ORDED AREA | VIDEO FILE #1 | | | PC FILE | UN-REC-ORDED AREA |
| | | | REC-ORDED | UNREC-ORDED AREA | REC-ORDED | | |

LBN  A     B     C     D     E     F     G

FILE ENTRY OF PC FILE          ... FE(AD(A)) AND FE(AD(F))
FILE ENTRY OF VIDEO FILE #1    ... FE(AD(C))

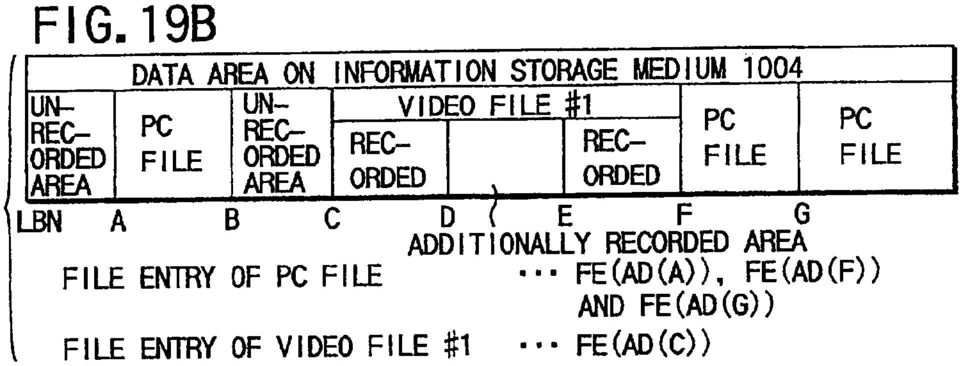

FIG. 19C

| DATA AREA ON INFORMATION STORAGE MEDIUM 1004 | | | | | | | |
|---|---|---|---|---|---|---|---|
| UN-REC-ORDED AREA | PC FILE | UN-REC-ORDED AREA | VIDEO FILE #1 | | | PC FILE | PC FILE |
| | | | REC-ORDED | | REC-ORDED | | |

LBN  A     B     C     D     E     F     G

ADDITIONALLY RECORDED AREA

FILE ENTRY OF PC FILE          ... FE(AD(A)), FE(AD(F))
                                   AND FE(AD(G))
FILE ENTRY OF VIDEO FILE #1    ... FE(AD(C))

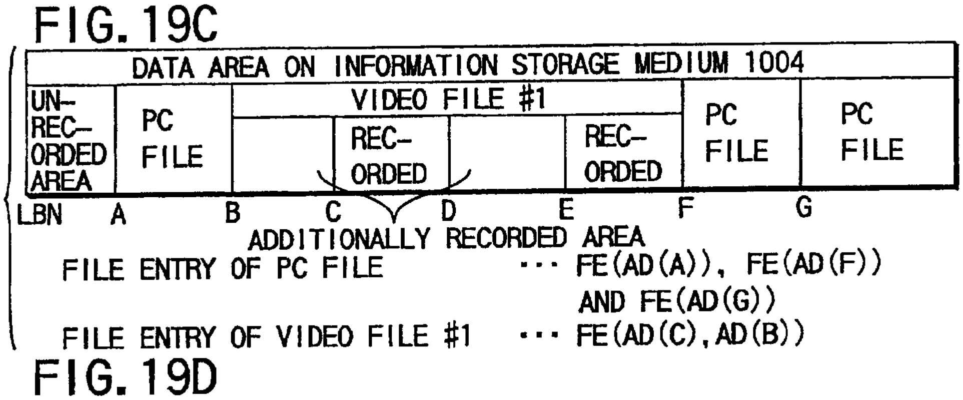

FIG. 19D

| DATA AREA ON INFORMATION STORAGE MEDIUM 1004 | | | | | | |
|---|---|---|---|---|---|---|
| UN-REC-ORDED AREA | PC FILE | VIDEO FILE #1 | | | PC FILE | PC FILE |
| | | REC-ORDED | | REC-ORDED | | |

LBN  A     B     C     D     E     F     G

ADDITIONALLY RECORDED AREA

FILE ENTRY OF PC FILE          ... FE(AD(A)), FE(AD(F))
                                   AND FE(AD(G))
FILE ENTRY OF VIDEO FILE #1    ... FE(AD(C), AD(B))

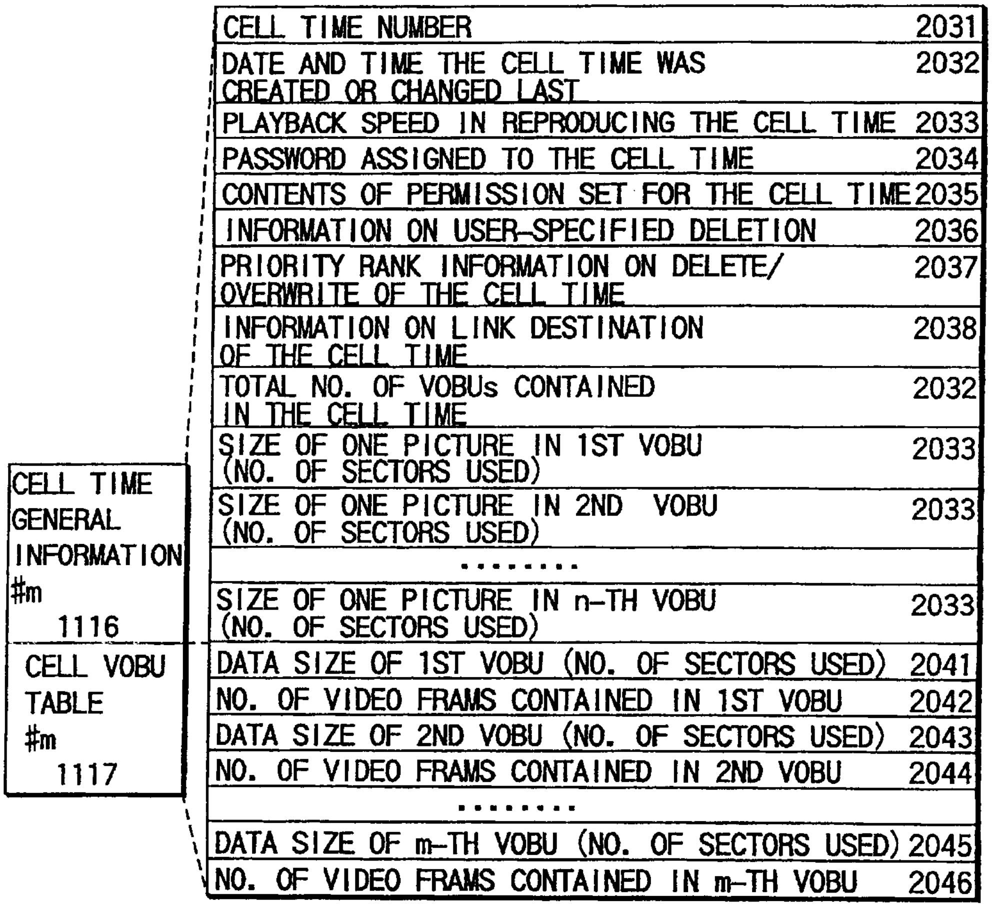

THE CONTENTS OF PLAYBACK SPEED 2033 IN REPRODUCING CELL TIME

000:NORMAL ONEFOLD-SPEED PLAYBACK
001:FF(TWOFOLD-SPEED PLAYBACK)
010:FF(FOURFOLD-SPEED PLAYBACK)
011:FF(EIGHTFOLD-SPEED PLAYBACK)
100:REVERSE-DIRECTION ONEFOLD-SPEED
101:FR(TWOFOLD-SPEED REVERSE ROTATION)
111:SETTING PLAYBACK SPEED ON DRIVE SIDE

THE CONTENTS OF PERMISSION SET FOR THE CELL TIME

00:PERMITS ALL USERS TO REPRODUCE, DELETE, AND CHANGE INFORMATION
01:PERMITS ALL USERS TO REPRODUCE INFORMATION PERMITS ONLY PERSON ENTERING PASSWORD TO DELETE AND CHANGE INFORMATION
10:PERMITS ONLY PERSON ENTERING PASSWORD TO REPRODUCE, DELETE AND CHANGE INFORMATION

FIG. 20

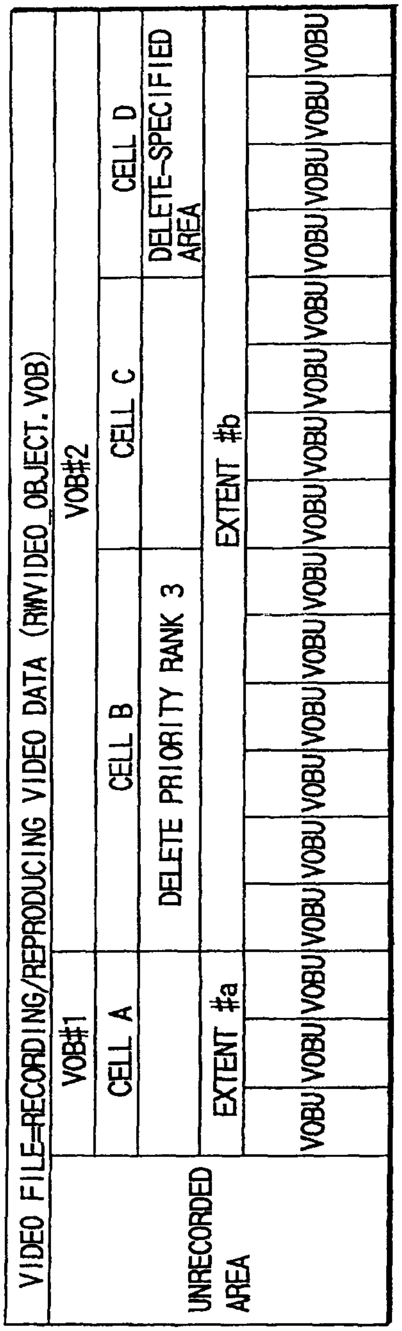

FIG. 21A

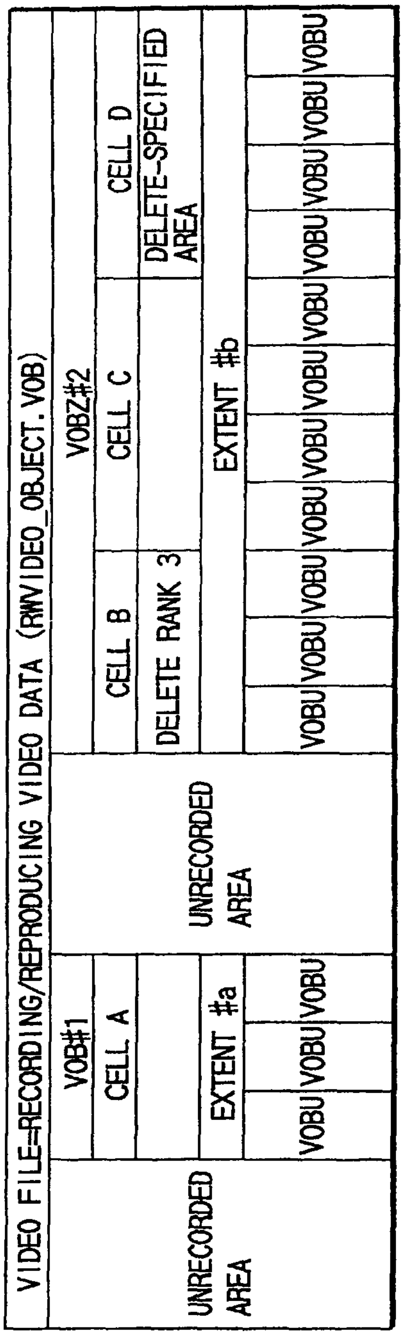

FIG. 21B

| VIDEO FILE-RECORDING/REPRODUCING VIDEO DATA (RWVIDEO_OBJECT.VOB) | | | | |
|---|---|---|---|---|
| | VOB#1 | VOB#2 | | |
| | CELL A | CELL B | CELL C | CELL D |
| | | DELETE PRIORITY RANK 3 | | DELETE-SPECIFIED AREA |
| UNRECORDED AREA | EXTENT #a | EXTENT #b | | |
| | VOBU VOBU VOBU | VOBU VOBU VOBU VOBU VOBU VOBU VOBU VOBU VOBU VOBU VOBU VOBU | | |

| VIDEO FILE-RECORDING/REPRODUCING VIDEO DATA (RWVIDEO_OBJECT.VOB) | | | | |
|---|---|---|---|---|
| | VOB#1 | VOBZ#2 | | |
| | CELL A | CELL B | CELL C | CELL D |
| | | DELETE RANK 3 | | DELETE-SPECIFIED AREA |
| UNRECORDED AREA | EXTENT #a | UNRECORDED AREA | EXTENT #b | |
| | VOBU VOBU VOBU | | VOBU VOBU VOBU VOBU VOBU VOBU VOBU VOBU VOBU | |

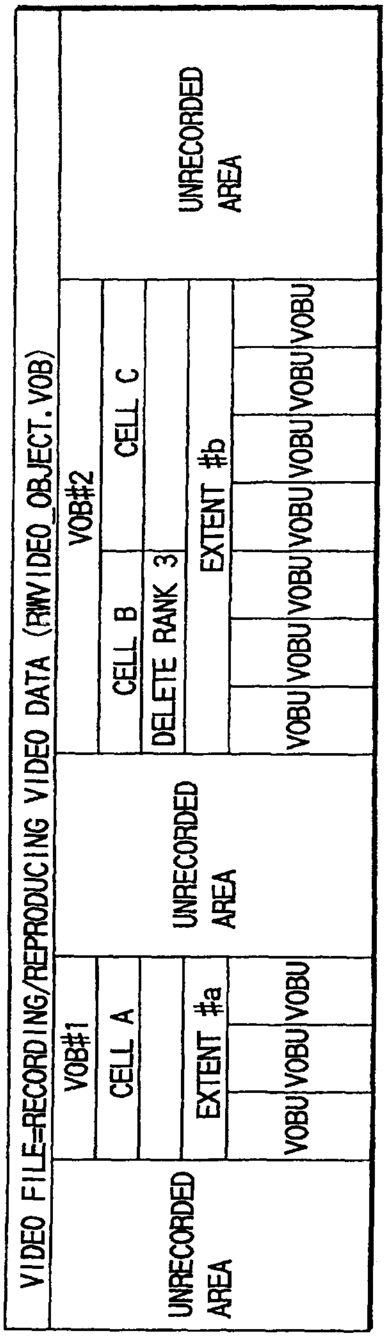

FIG. 21C

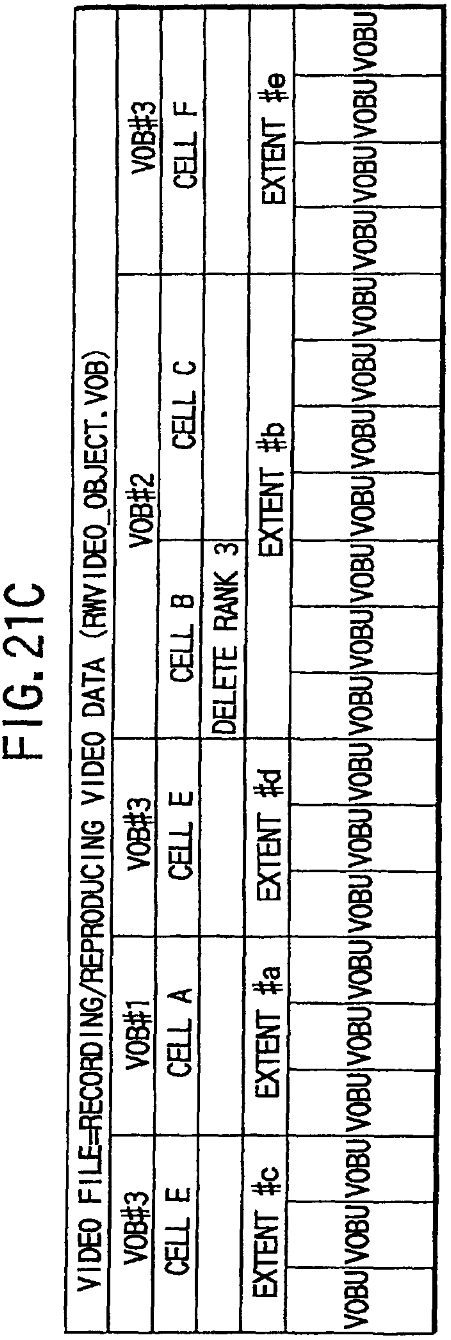

FIG. 21D

| VIDEO FILE=RECORDING/REPRODUCING VIDEO DATA (RMVIDEO_OBJECT.VOB) | | | | |
|---|---|---|---|---|
| VOB#1 | | VOB#2 | | |
| CELL A | | CELL B | CELL C | |
| EXTENT #a | | DELETE RANK 3 | | UNRECORDED AREA |
| | UNRECORDED AREA | EXTENT #b | | |
| VOBU VOBU VOBU | | VOBU VOBU VOBU VOBU VOBU VOBU | | |

| VIDEO FILE=RECORDING/REPRODUCING VIDEO DATA (RMVIDEO_OBJECT.VOB) | | | | | | |
|---|---|---|---|---|---|---|
| VOB#3 | VOB#1 | VOB#3 | VOB#2 | | VOB#3 | |
| CELL E | CELL A | CELL E | CELL B | CELL C | CELL F | |
| EXTENT #c | EXTENT #a | EXTENT #d | DELETE RANK 3 | | EXTENT #e | |
| | | | EXTENT #b | | | |
| VOBU VOBU VOBU | VOBU VOBU VOBU | VOBU VOBU VOBU VOBU VOBU | VOBU VOBU VOBU VOBU VOBU VOBU | | VOBU VOBU VOBU VOBU VOBU | |

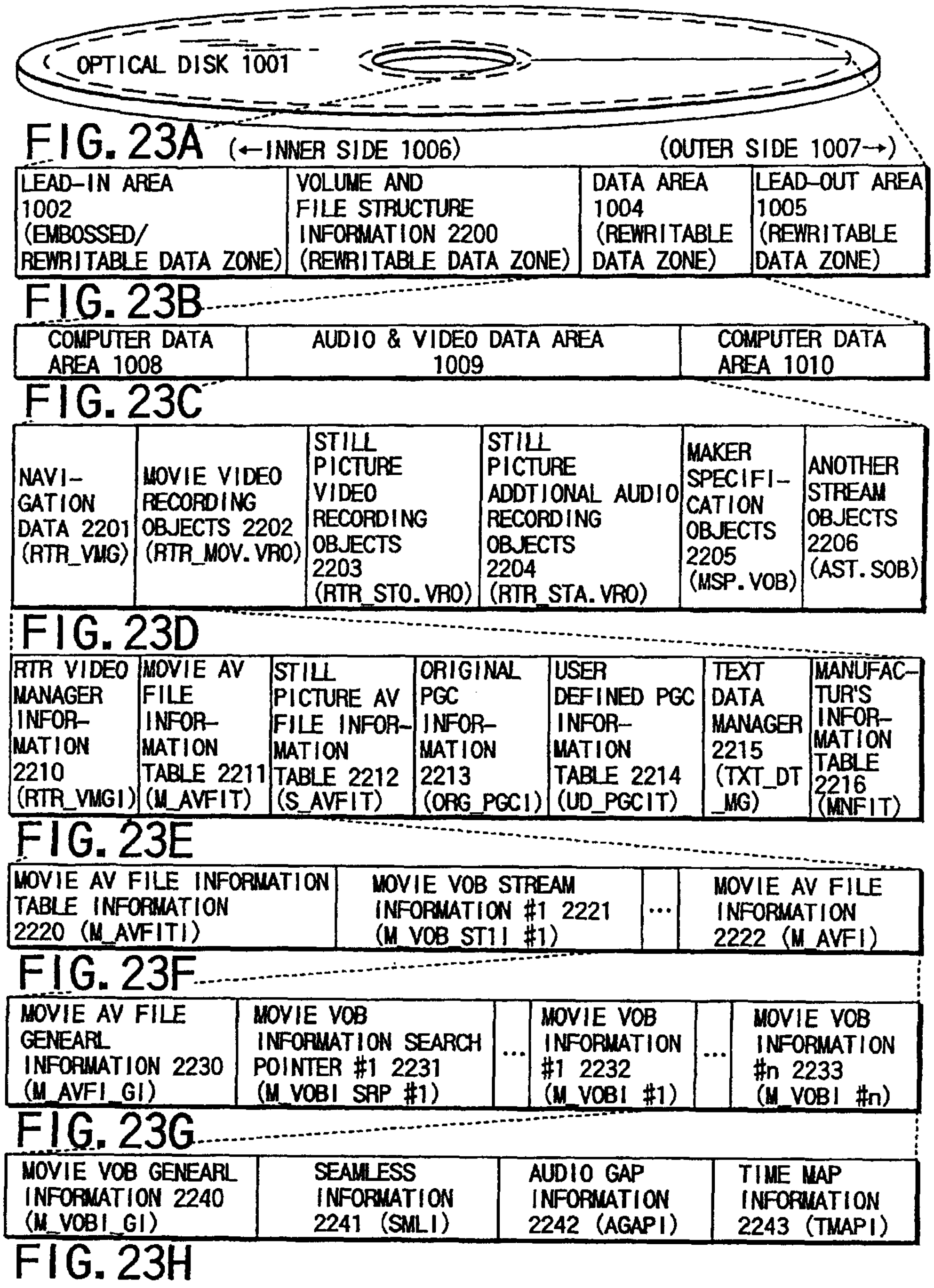
OPTICAL DISK 1001
FIG. 23A
(←INNER SIDE 1006)
(OUTER SIDE 1007→)
LEAD-IN AREA 1002 (EMBOSSED/ REWRITABLE DATA ZONE)
VOLUME AND FILE STRUCTURE INFORMATION 2200 (REWRITABLE DATA ZONE)
DATA AREA 1004 (REWRITABLE DATA ZONE)
LEAD-OUT AREA 1005 (REWRITABLE DATA ZONE)
FIG. 23B
COMPUTER DATA AREA 1008
AUDIO & VIDEO DATA AREA 1009
COMPUTER DATA AREA 1010
FIG. 23C
NAVI-GATION DATA 2201 (RTR_VMG)
MOVIE VIDEO RECORDING OBJECTS 2202 (RTR_MOV.VRO)
STILL PICTURE VIDEO RECORDING OBJECTS 2203 (RTR_STO.VRO)
STILL PICTURE ADDTIONAL AUDIO RECORDING OBJECTS 2204 (RTR_STA.VRO)
MAKER SPECIFI-CATION OBJECTS 2205 (MSP.VOB)
ANOTHER STREAM OBJECTS 2206 (AST.SOB)
FIG. 23D
RTR VIDEO MANAGER INFOR-MATION 2210 (RTR_VMGI)
MOVIE AV FILE INFOR-MATION TABLE 2211 (M_AVFIT)
STILL PICTURE AV FILE INFOR-MATION TABLE 2212 (S_AVFIT)
ORIGINAL PGC INFOR-MATION 2213 (ORG_PGCI)
USER DEFINED PGC INFOR-MATION TABLE 2214 (UD_PGCIT)
TEXT DATA MANAGER 2215 (TXT_DT_MG)
MANUFAC-TUR'S INFOR-MATION TABLE 2216 (MNFIT)
FIG. 23E
MOVIE AV FILE INFORMATION TABLE INFORMATION 2220 (M_AVFITI)
MOVIE VOB STREAM INFORMATION #1 2221 (M_VOB_STI #1)
...
MOVIE AV FILE INFORMATION 2222 (M_AVFI)
FIG. 23F
MOVIE AV FILE GENEARL INFORMATION 2230 (M_AVFI_GI)
MOVIE VOB INFORMATION SEARCH POINTER #1 2231 (M_VOBI_SRP #1)
...
MOVIE VOB INFORMATION #1 2232 (M_VOBI #1)
...
MOVIE VOB INFORMATION #n 2233 (M_VOBI #n)
FIG. 23G
MOVIE VOB GENEARL INFORMATION 2240 (M_VOBI_GI)
SEAMLESS INFORMATION 2241 (SMLI)
AUDIO GAP INFORMATION 2242 (AGAPI)
TIME MAP INFORMATION 2243 (TMAPI)
FIG. 23H

PGC_GI (DESCRIPTION ORDER)

| RBP | FIELD NAME | CONTENTS | NUMBER OF BYTES |
|---|---|---|---|
| 0 | RESERVED | RESERVED | 1 BYTE |
| 1 | PG_Ns | NUMBER OF PGCs | 1 BYTE |
| 2 TO 3 | CI_SRP_Ns | NUMBER OF CI_SRPs | 2 BYTES |
| TOTAL | | | 4 BYTES |

RBP:RELATIVE BYTE POSITION

FIG. 28

PGI (DESCRIPTION ORDER)

| RBP | FIELD NAME | CONTENTS | NUMBER OF BYTES |
|---|---|---|---|
| 0 | RESERVED | RESERVED | 1 BYTE |
| 1 | PG_TY | PROGRAM TYPE | 1 BYTE |
| 2 TO 3 | C_Ns | NUMBER OF CELLS IN THIS PG | 2 BYTES |
| 4 TO 131 | PRM_TXTI | PRIMARY TEXT INFORMATION | 128 BYTES |
| 132 TO 133 | IT_TXT_SRPN | IT_TXT_SRP NUMBER | 2 BYTES |
| 134 TO 141 | THM_PTRI | THUMBNAIL POINTER INFORMATION | 8 BYTES |
| TOTAL | | | 142 BYTES |

RBP:RELATIVE BYTE POSITION

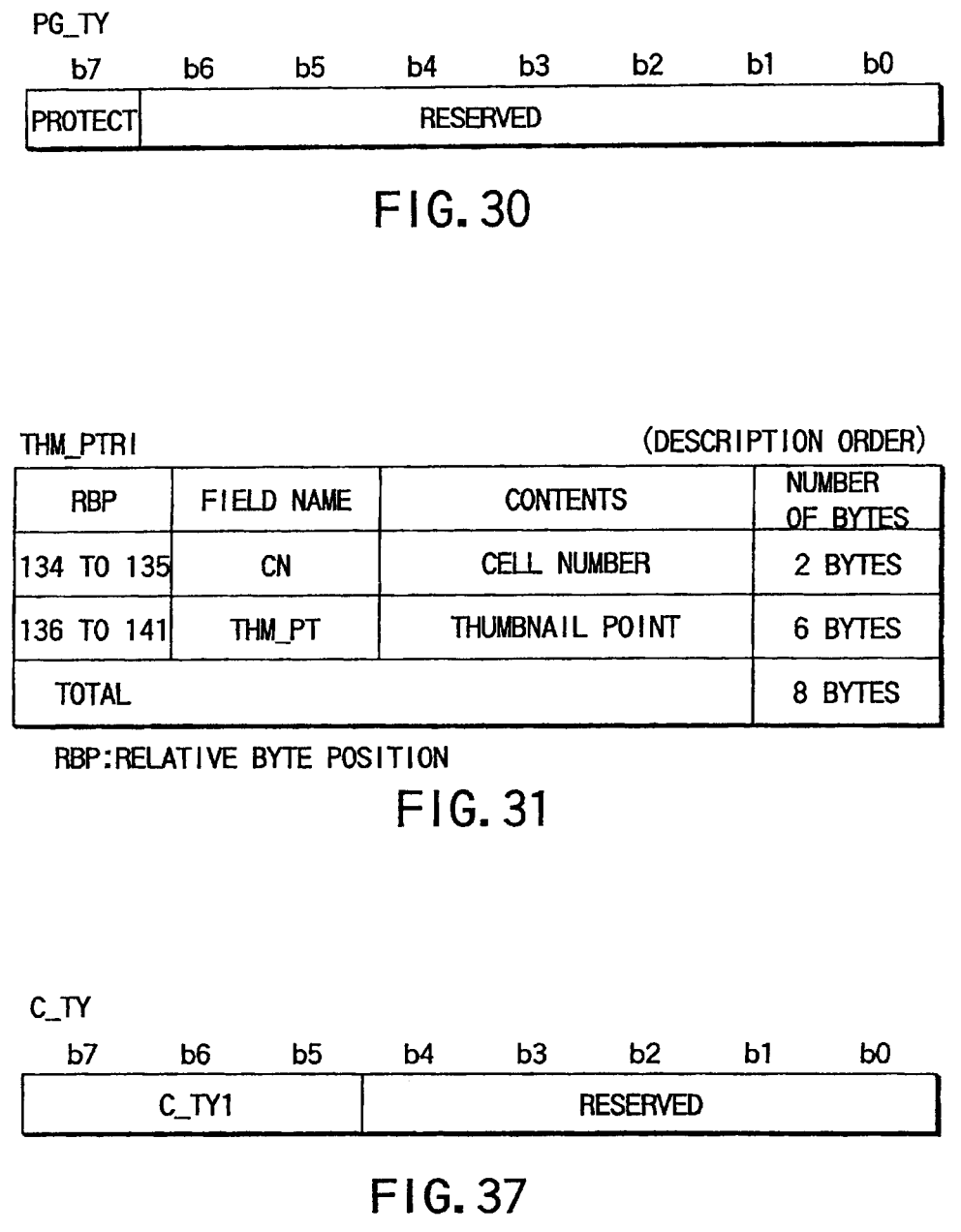

| b7 | b6 | b5 | b4 | b3 | b2 | b1 | b0 |
|---|---|---|---|---|---|---|---|
| PROTECT | RESERVED | | | | | | |

FIG. 30

THM_PTRI (DESCRIPTION ORDER)

| RBP | FIELD NAME | CONTENTS | NUMBER OF BYTES |
|---|---|---|---|
| 134 TO 135 | CN | CELL NUMBER | 2 BYTES |
| 136 TO 141 | THM_PT | THUMBNAIL POINT | 6 BYTES |
| TOTAL | | | 8 BYTES |

RBP: RELATIVE BYTE POSITION

| b7 | b6 | b5 | b4 | b3 | b2 | b1 | b0 |
|---|---|---|---|---|---|---|---|
| C_TY1 | | | RESERVED | | | | |

FIG. 37

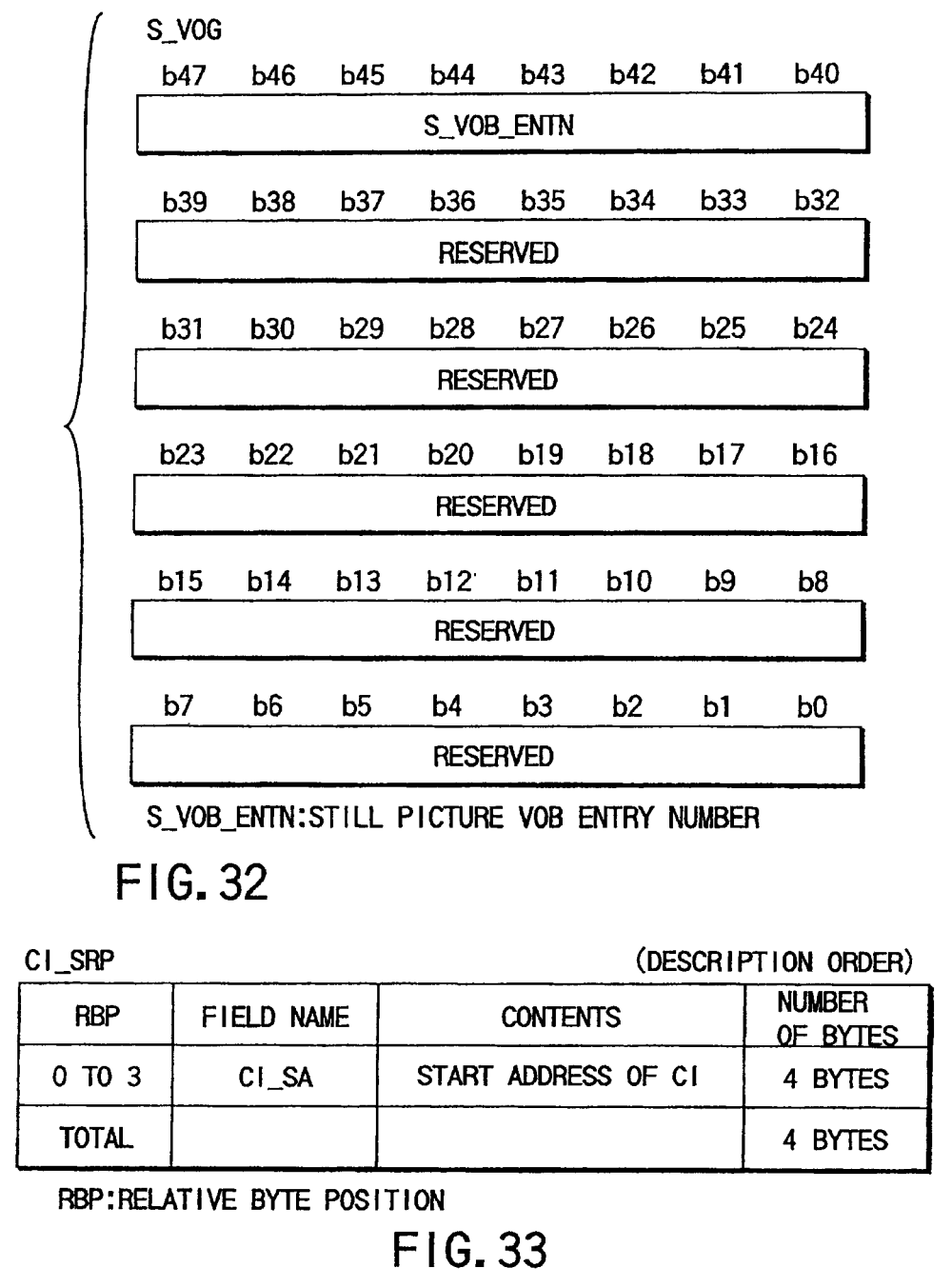

S_VOG

| b47 | b46 | b45 | b44 | b43 | b42 | b41 | b40 |
|---|---|---|---|---|---|---|---|
| S_VOB_ENTN | | | | | | | |

| b39 | b38 | b37 | b36 | b35 | b34 | b33 | b32 |
|---|---|---|---|---|---|---|---|
| RESERVED | | | | | | | |

| b31 | b30 | b29 | b28 | b27 | b26 | b25 | b24 |
|---|---|---|---|---|---|---|---|
| RESERVED | | | | | | | |

| b23 | b22 | b21 | b20 | b19 | b18 | b17 | b16 |
|---|---|---|---|---|---|---|---|
| RESERVED | | | | | | | |

| b15 | b14 | b13 | b12 | b11 | b10 | b9 | b8 |
|---|---|---|---|---|---|---|---|
| RESERVED | | | | | | | |

| b7 | b6 | b5 | b4 | b3 | b2 | b1 | b0 |
|---|---|---|---|---|---|---|---|
| RESERVED | | | | | | | |

S_VOB_ENTN:STILL PICTURE VOB ENTRY NUMBER

FIG. 32

CI_SRP (DESCRIPTION ORDER)

| RBP | FIELD NAME | CONTENTS | NUMBER OF BYTES |
|---|---|---|---|
| 0 TO 3 | CI_SA | START ADDRESS OF CI | 4 BYTES |
| TOTAL | | | 4 BYTES |

RBP:RELATIVE BYTE POSITION

FIG. 33

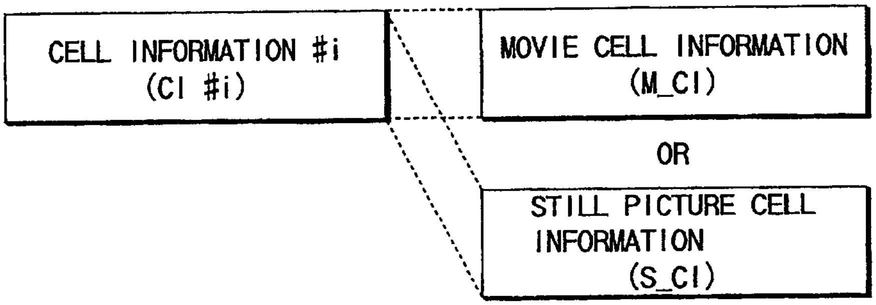
FIG. 34
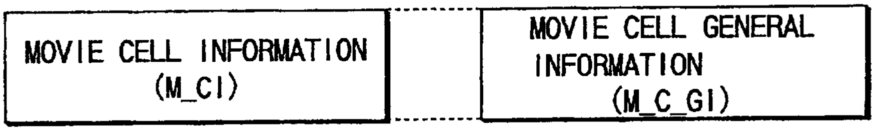
FIG. 35
M_C_GI (DESCRIPTION ORDER)
| RBP | FIELD NAME | CONTENTS | NUMBER OF BYTES |
|---|---|---|---|
| 0 | RESERVED | RESERVED | 1 BYTE |
| 1 | C_TY | CELL TYPE | 1 BYTE |
| 2 TO 3 | M_VOBI_SRPN | MOVIE VOBI SEARCH POINTER NUMBER | 2 BYTES |
| 4 TO 5 | C_EPI_Ns | NUMBER OF CELL ENTRY POINT INFORMATION | 2 BYTES |
| 6 TO 11 | C_V_S_PTM | START PTM OF THIS CELL | 6 BYTES |
| 12 TO 17 | C_V_E_PTM | END PTM OF THIS CELL | 6 BYTES |
| TOTAL | | | 18 BYTES |
RBP:RELATIVE BYTE POSITION
FIG. 36

INFORMATION RECORDING METHOD, INFORMATION RECORDING MEDIUM, AND INFORMATION REPRODUCING METHOD, WHEREIN INFORMATION IS STORED ON A DATA RECORDING PORTION AND A MANAGEMENT INFORMATION RECORDING PORTION

CROSS REFERENCE TO RELATED APPLICATIONS

This application is divisional of application Ser. No. 11/505,304, filed Aug. 17, 2006, which is a divisional of application Ser. No. 10/195,789, filed Jul. 16, 2002, now granted as U.S. Pat. No. 7,362,953, the entire contents of each are hereby incorporated by reference. Application Ser. No. 10/195,789 is a divisional of 09/651,295, filed Aug. 30, 2000, now granted as U.S. Pat. No. 6,529,681, which is a divisional of application Ser. No. 09/311,272, filed May 14, 1999, now granted as U.S. Pat. No. 6,341,196. This application also claims priority and contains subject matter related to Japanese Patent Application No. 10-133832, filed in the Japanese Patent Office on May 15, 1998.

BACKGROUND OF THE INVENTION

This invention is concerned with the improvements in and relating to an information recording method of recording video information on an information storage medium and an information reproducing method of reproducing the video information from the information storage medium, and more particularly to those suitable for a case where the video information recorded on the information storage medium is the digital video information compressed according to the MPEG (Moving Picture Image Coding Experts Group) standards.

In recent years, systems for playing back an optical disk on which video (or moving picture) information and audio information have been recorded have been developed. They have been widely used in the form of, for example, LDs (Laser Disks) or video CDs (Compact Disks) for the purpose of reproducing movie software or karaoke.

In this connection, the DVD (Digital Versatile Disk) standard employing the internationally standardized MPEG-2 scheme and the AC (Audio Compression)-3 or other audio compression schemes has been proposed. The DVD standard covers playback-only DVD video (or DVD-ROM (Read-Only Memory)), write-once DVD-R (Recordable), rewritable DVD-RAM (Random Access Memory) (or DVD-RW (Rewritable)).

The DVD video (DVD-ROM) standard supports MPEG-2 for moving picture compression scheme and not only liner PCM (Pulse Code Modulation) but also AC-3 audio and MPEG audio for audio recording scheme.

The DVD video standard further supports sub-picture data obtained by run-length compressing the bit map data for subtitles and reproduce control data (navigation data) for data searching by fast-forward playback or fast-rewind playback.

Furthermore, the DVD video standard supports ISO (International Organization for Standardization) 9660 and UDF (Universal Disk Format) to allow computers to read data.

For DVD video (DVD-ROM) optical disks, a 12-cm diameter single-sided single-layer disk has a storage capacity of about 4.7 GB (Giga Bytes); a 12-cm diameter single-sided double-layer disk has a storage capacity of about 9.5 GB; and a 12-cm diameter double-sided double-layer disk has a storage capacity of about 18 GB, provided that 650-nm (nanometers) wavelength laser light is used for reading.

On the other hand, for DVD-RAM (DVD-RW) optical disks, at the present time, a 12-cm diameter single-sided disk has a storage capacity of about 2.6 GB and a 12-cm diameter double-sided disk has a storage capacity of about 5.2 GB. Namely, DVD-RAM optical disks in practical use have a smaller storage capacity than DVD-ROM disks of the same size.

In playback-only DVD video (DVD-ROM), like a hierarchical file structure used by a general-purpose computer operating system, the directory structure of information (data files) recorded on an information storage medium is such that a subdirectory of video title set VTS and a subdirectory of audio title set ATS are connected to a root directory as shown in FIG. 1.

In the subdirectory of video title set VTS, various video files (including VMGI, VMGM, VTSI, VTSM, and VTS) are so arranged that the individual files can be managed in order. A specific file (for example, a specific VTS) can be accessed by specifying a path from the root directory to the file.

Specifically, the root directory of a DVD video disk includes a subdirectory called video title set VTS. The subdirectory can contain various management data files including VIDEO_TS.IFO or VTS__01__0.IFO, backup files, including VIDEO_TS.BUP and VTS__01__0.BUP, for backing up the information in those management data files, and a video data file VTS__01__1.VOB managed on the basis of the contents of the management data files and used to store digital video information. The subdirectory can also contain menu data files (including VMGM and VTSM) for storing specific menu information.

A DVD video disk is composed of a video manager VMG and at least one or up to 99 video title sets VTSs. The video manager VMG is composed of control data VMGI, VMG menu video object set VMGM_VOBS, and backup control data VMGI_BUP. Each data is recorded on an information storage medium as a single file.

As shown in FIG. 1, on the DVD video disk, the individual video title sets (e.g., video title set VTS #1 and video title set VTS #2) have to be recorded in separate files. In each video title set (e.g., video title set VTS #1), control data VTSI, VTS menu video object set VTSM_VOBS, and backup control data VTSI_BUP are recorded in separate files. Additionally, title video data VTS__01__1.VOB and VTS__01__2.VOB in the VTS are recorded in plural files.

The DVD-RAM disk uses a UDF file system, not a FAT (File Allocation Table) file system. The details of UDF will be described in details later. Like FAT, UDF enables a hierarchical structure of files and records data in files on an information storage medium. In the prior art, both of the UDF file and the FAT file are filled with data and have no unrecorded area in them.

The contents will be explained in detail using one example. For example, when a statement has been written using word processor software (such as Ichitaro, Word, or Amipro) running on a PC (Personal Computer), the written statement is recorded on an information storage medium as a file. In this case, all the file is filled with text data. Even if a space area or a continuous enter mark portion with no sentence continues long in the middle of the written sentence, that portion in the stored file will be filled with space data and enter data and therefore there will be no fully unrecorded area in the file.

Even when the user reads the document file and stores the data after deleting the middle of the sentence, an unrecorded area is never defined in the stored information and is recorded on the information storage medium as a file with the data items before and after the deleted portion putting together. As a result, the size of the file recorded on the information storage medium decreases by the amount of data in the deleted portion.

With application software running on an ordinary PC, a file read from an information storage medium for editing is transferred as it is to a buffer memory (semiconductor memory) on the PC. The edited data is stored temporarily in the buffer memory on the PC. Once the user has given an instruction to store the file, the edited data stored in the buffer memory on the PC is written over the whole file on the information storage medium. As described above, with the conventional file system, such as a FAT or UDF file system, when the file data is changed, all the data in the file is changed at a time in the overwrite process. This is different from the present invention where the data in only a part of the file is changed.

FIGS. 2A and 2B illustrate examples of reproducing video information using program chains PGCs on a DVD video disk. As shown in FIG. 2A, the playback data is divided into cells and playback sections from cell A to cell F are specified. In the individual program chains PGC #1 to #3, PGC information is defined as shown in FIG. 2B. Specifically, the table in FIG. 2B reads as follows.

1. Program chain PGC #1 shows an example of being made up of cells specifying consecutive playback sections. The playback sequence is:

Cell A→Cell B→Cell C.

2. Program chain PGC #2 shows an example of being made up of cells specifying intermittent playback sections. The playback sequence is:

Cell D→Cell E→Cell F.

3. Program chain PGC #3 shows an example of being made up of cells specifying disorderly playback sections, regardless of the direction of playback or repetitive playback. The playback sequence is:

Cell E→Cell A→Cell D→Cell B→Cell E

By defining different program chains PGCs as described above, different display sequences can be realized for the same cells. In a DVD video disk, all the cell information is not necessarily displayed by a single program chain PGC because of the freedom of program chain PGC setting.

What has been explained above is about the data structure of the video information recorded on a playback-only DVD video disk. An information storage medium capable of recording and reproducing video information using a DVD-RAM disk or a DVD-RW disk is now being developed as one form of the DVD family.

It is desirable that the video information recording format on the information storage medium capable of video recording and reproducing should have a continuity and a relation with the data structure of a DVD video disk. In addition, a UDF file system is used for DVD-RAM disks or DVD-RW disks, as in the playback-only DVD video disk.

When the data structure of the aforementioned DVD video disk is used directly as the data structure on a recordable (videorecordable) information storage medium and the above conventional UDF (or FAT) file system is used, the following problems arise:

1. Since the control data and video data are recorded in such a manner that they are distributed over plural files, when having deleted a file by mistake, the user is unaware of the position of the error until trying to reproduce the deleted file in the course of playback. For the playback-only DVD video disk, there is no possibility that the user will delete a file. In the case of recordable/erasable information storage mediums, however, there is a danger that the user will delete a file by mistake.

2. Since the control data and video data are recorded in such a manner that they are distributed over plural files and the data structure has the same hierarchical structure as that of the computer data, it is difficult for the family user unfamiliar with the computer to understand the deleted place or the recorded place. Specifically, knowing only the VTR (Video Tape Recorder) as a medium capable of recording video information, the family user wonders which part of the single tape the place where the picture has been recorded or deleted has occupied. Therefore, showing the user small files of record or the result of erasing as they are would throw the user into confusion.

As shown in FIG. 1, in the DVD video disk, information is recorded in such a manner that it is divided into separate files by video title set VTS. Thus, when plural video title sets (VTS#1 and VTS#2 in FIG. 1) have been recorded on the information storage medium, the user familiar with only the VTR has no idea about the playback procedure.

3. With a method of allowing the family user to select a specific cell corresponding to a program chain PGC for the recorded information, some user is liable to fall into confusion. Specifically, knowing only the VTR as a medium capable of recording video information, the family user will probably wonder which part of the single tape the place where the picture has been recorded or deleted has occupied. Therefore, it would be difficult for the user to understand the concept of selecting cells by a program chain PGC on a playback-only DVD video disk.

4. In a data file recorded using the conventional UDF or FAT, there is no unrecorded area. Therefore, when part of a specific data item in a file has been deleted or a few pieces of video information have been added, the data items in front of and behind the deleted portion are squeezed together and connected or the pieces of information are added to the end of the existing data. Each time data is deleted or added, the size of the whole data file has to be changed and all the changed data file has to be recorded on the information storage medium again. As a result, it take a very long time to complete the editing process.

Specifically, with the conventional UDF or FAT, since a file has no unrecorded area, the following processes cannot be carried out:

(a) The process of changing the erased place to an unrecorded area when part of the data in a file has been deleted.

(b) The process of recording additional data on an unrecorded area in a file without changing the entire file size.

Therefore, each time the data is deleted partially or added, the file size has to be changed.

As a result, the entire file has to be recorded again on the information storage medium. In the case of a video file in which video information has been recorded, the size of a single video file is as large as more than several hundreds of megabytes (MB). If a file as large as several hundreds of megabytes is all recorded again on the information storage medium each time a slight change has been made, it will take an extremely long time to change the contents of the file.

For a further description of the prior art, reference may be made to:

Japanese Patent Application No. 040876 (filed on Feb. 23, 1998)

Japanese Patent Application No. 040877 (filed on Feb. 23, 1998)

Japanese Patent Application No. 040879 (filed on Feb. 23, 1998).

BRIEF SUMMARY OF THE INVENTION

It is, accordingly, a first object of the present invention to overcome the disadvantages in the prior art by providing an information recording method for creating a data structure that causes a place where information is recorded or deleted on an information storage medium to correspond spuriously to a place on a single tape, such as a VTR tape, in order to provide the family user familiar with only the VTR as a medium capable of recording video information with an easy-to-use interface, and by providing an information reproducing method of reproducing the recorded information.

A second object of the present invention is to provide an information recording method for creating a data structure that enables the general user to find the mistake readily even when having deleted a file by mistake and an information method of reproducing the information created using the data structure.

To achieve the foregoing objects, at least one of a video file containing video information, a still picture file containing still picture information, and an audio file containing audio information is recorded on an information storage medium (e.g., an optical disk) in the invention. Specifically, at least one of a video file, a still picture file, and an audio file is recorded on an information storage medium on which information is recorded in files and from which the information recorded in a file can be read in a playback operation.

Furthermore, in the invention, a management file having management information on a control method of reproducing all the information recorded in at least one of a video file, a still picture file, and an audio file is recorded on an information storage medium (e.g., an optical disk). Specifically, a management file having not only a series of links to reproduce all the information in the recording file but also playback sequence information indicating the sequence for reproducing all the information recorded in the file is recorded on an information storage medium on which information is recorded in files and from which the information in a file can be read in a playback operation and on which at least one of a video file, a still picture file, and an audio file has been recorded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3H are related to an embodiment of the present invention and illustrate a hierarchical structure of information recorded on an optical disk;

FIGS. 10A and 10B are diagrams to help explain the relationship between cells and PGC information;

FIGS. 12A and 12B are diagrams to help explain an example of a file system constructed using a UDF;

FIGS. 13A and 13B are diagrams to help explain an example of a file system constructed using a UDF, by reference to FIGS. 12A and 12B;

FIG. 15 is a diagram of a part of the file ID descriptor for describing information on files (including root directory, subdirectories, and file data) in the file structure having the hierarchical structure of FIG. 4;

FIG. 16 is a diagram of a part of the contents of the file entry describing the recorded position of the specified file in the file structure having the hierarchical structure of FIG. 4;

FIG. 17 is a diagram to help explain the contents of a short allocation descriptor describing the recorded position of a consecutive sector set (extent) on an optical disk;

FIGS. 18A to 18D are diagrams to help explain a conventional method of setting file recording positions using a UDF;

FIGS. 19A to 19D are diagrams to help explain a method of setting file recording positions using a UDF related to the present invention;

FIG. 20 is a diagram to help explain a data structure of the cell time general information and cell VOBU table shown in FIG. 3H;

FIGS. 21A to 21D are diagrams to help explain the details of the data in the video file shown in FIG. 4;

FIGS. 23A to 23H are diagrams to help explain another example of a hierarchical structure of information recorded on an optical disk;

FIG. 28 is a diagram to help explain the details of the PGC general information in the PGC information;

FIG. 29 is a diagram to help explain the details of the program information in the PGC information;

FIG. 30 is a diagram to help explain the details of the program type in the program information;

FIG. 31 is a diagram to help explain the details of the thumbnail pointer information in the program information;

FIG. 32 is a diagram to help explain a still picture VOB group S_VOG for thumbnail points in the thumbnail pointer information;

FIG. 33 is a diagram to help explain the details of the cell information search pointer in the PGC information;

FIG. 34 is a diagram to help explain the details of the cell information in the PGC information;

FIG. 35 is a diagram to help explain the details of the movie cell information in the cell information;

FIG. 36 is a diagram to help explain the details of the movie cell general information constituting the movie cell information; and FIG. 37 is a diagram to help explain the details of the cell type in the movie cell general information.

DETAILED DESCRIPTION OF THE INVENTION

Figure 1:
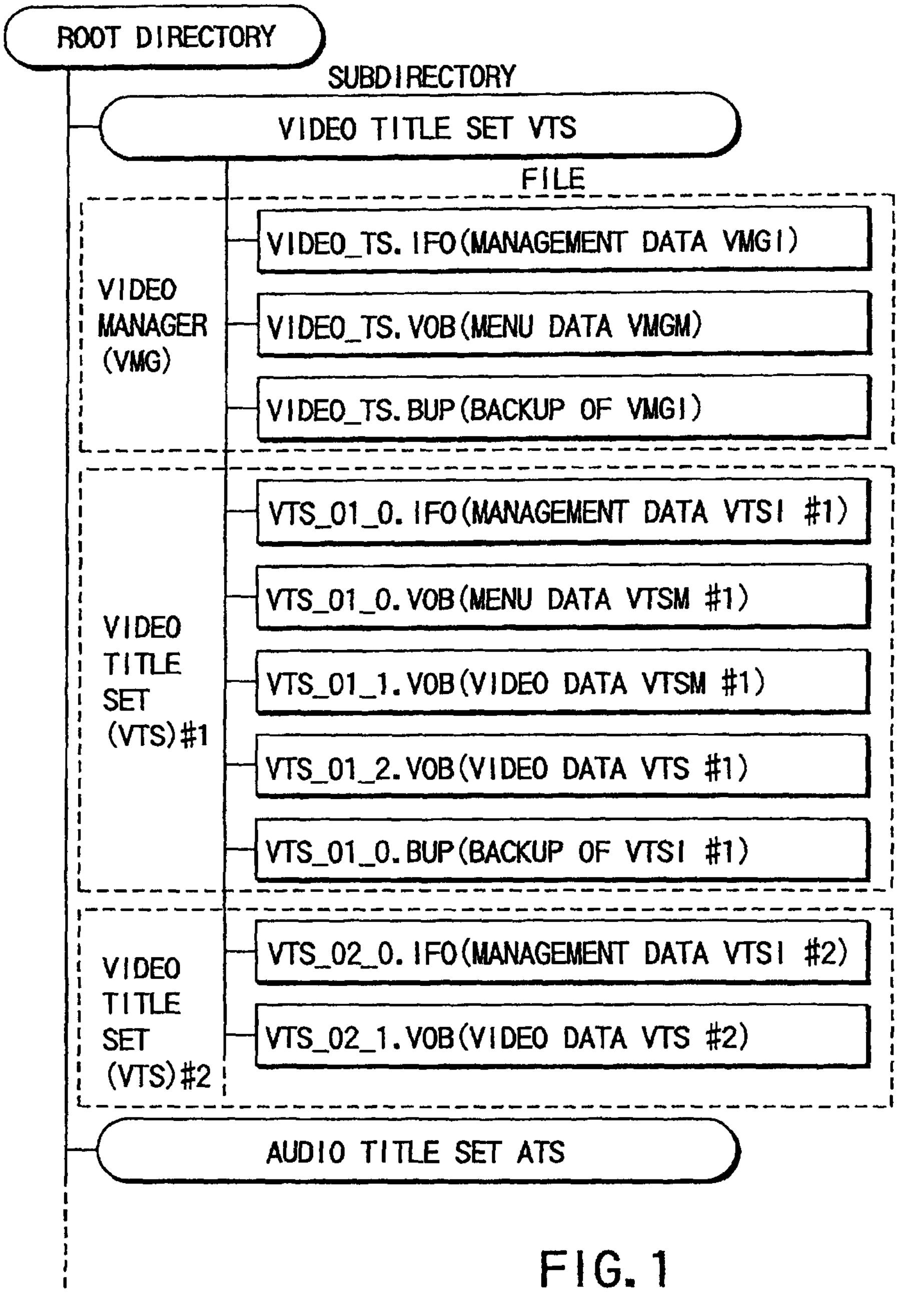
FIG. 1 is a diagram to help explain the structure of a conventional directory for information (data files) recorded on an optical disk.

Hereinafter, an embodiment of the present invention will be explained by reference to the accompanying drawings. Using FIGS. 3A to 3H, the data structure of video information recorded on an information storage medium by an information recording method of the present invention will be explained. FIG. 3A is a perspective view of an optical disk 1001 serving as an information storage medium.

FIG. 3B shows a rough data structure of information recorded on the optical disk 1001. In FIG. 3B, a lead-in area 1002, volume & file manager information 1003, a data area 1004, and a lead-out area 1005 are arranged in that order from the inner circumference side 1006 to outer circumference side 1007 of the optical disk 1001.

The lead-in area 1002 has an embossed data zone where the light reflecting surface is uneven, a mirror zone where the surface is flat (mirrorlike), and a rewritable data zone where information can be rewritten.

In the volume & file manager information 1003, information on all of the audio & video data files or volumes is recorded in a rewritable data zone where the user can record or rewrite data.

The data area 1004 has a rewritable data zone where the user can record or rewrite data. The lead-out area 1005 is made up of a rewritable data zone where information can be rewritten.

In the embossed data zone of the lead-in area 1002, the following pieces of information have been recorded beforehand: information on the disk type, such as DVD-ROM/-RAM/-R, the disk size, and the recording density, information on all of the information storage medium, including physical sector numbers indicating the recording start/recording end positions, information on recording, reproducing, and erasing characteristics, including the recording power, recording pulse width, erasing power, reproducing power, and linear velocity in recording or erasing, and information on the manufacture of individual information storage mediums, including serial numbers.

Each of the rewritable zone in the lead-in area 1002 and that in the lead-out area 1005 has a disk name recording area for each information storage medium, a trial recording area (for checking the recording and erasing conditions), and a management information recording area for defective areas in the data area 1004. An information recording and reproducing apparatus can record information on each of those areas.

In the data area 1004 sandwiched between the lead-in area 1002 and the lead-out area 1005, computer data and audio & video data can be recorded in such a manner that they are intermingled as shown in FIG. 3C. The order in which computer data and audio & video data are recorded and the recording information size of them are arbitrary. The areas in which computer data is recorded are called computer data areas 1008, 1010. The area in which audio & video data is recorded is called an audio & video data area 1009.

As shown in FIG. 3D, the data structure of information recorded in the audio & video data area 1009 includes control information 1011 necessary to perform each of video recording (audio recording), reproducing, editing, and retrieving processes, a video object 1012 of video information on the contents of the video data, a picture object 1013 of information on thumbnails for retrieving the desired one of the still pictures, including slides, or the desired part of the video data or on thumbnails for editing, and an audio object 1014 of information on the recording of the contents of audio data.

As shown in FIG. 3E, the contents of the control information 1011 include AV data control information 1101 that controls the data structure of the video object 1012 and is management information about information on the recording position on an optical disk 1001 serving as an information storage medium, playback control information 1021 serving as control information necessary in playback, recording control information 1022 serving as control information necessary in recording (video recording and audio recording), edit control information 1023 serving as control information necessary in editing, and thumbnail picture control information 1024 serving as management information on thumbnails (thumbnail pictures) for retrieving the desired portion of the video data or for editing.

As shown in FIG. 3F, the data structure of the AV data control information 1101 includes PGC control information 1103 serving as information on video information playback programs (sequence) and cell time control information 1104 serving as information on the data structure used as an audio information basic unit.

What has been described above is a general view of FIGS. 3A to 3F. Some supplementary explanation will be given about each piece of information. In the volume & file manager information 1003, information on all the volume and information on the number of files of contained PC data, the number of files of AV data, and recording layer information are recorded.

The following are recorded as the recording layer information: the number of component layers (e.g., a single RAM/ROM two-layer disk is counted as two layers, a single ROM two-layer disk is counted as two layers, and an n number of single-sided disks are counted as n layers), a logical sector number range table allocated to each layer (a capacity for each layer), characteristics for each layer (e.g., a DVD-RAM disk, the RAM section of a RAM/ROM two-layer disk, a CD-ROM, and a CD-R), a logical sector number range table allocated in zones in the RAM area for each layer (including information on the capacity of the rewritable area for each layer), and ID (Identifier) information unique to each layer (to find disk replacement in the multiple-disk pack). The recording layer information makes it possible to set consecutive logical sector numbers to a multiple-disk pack or a RAM/ROM two-layer disk to create a single large volume space.

Furthermore, the following are recorded in the playback control information 1021: information on a playback sequence for the integration of programp chains PGCs, the original PGC information (corresponding to 2213 in FIG. 23E or the original PGC in FIG. 25) or the information (the sequence for reproducing all the recorded cells consecutively) indicating spurious recording positions when an information storage medium is regarded as a single tape, such as a VTR or a DVC (Digital Video Cassette), information on simultaneous playback of plural screens with different pieces of video information, and retrieval information (that causes the corresponding ID and the start time table in the cell to be recorded for each retrieval category and enables the user to select a category and access the video information directly).

Moreover, in the recording control information 1022, program reserved recording information is recorded. In addition, the following are recorded in the edit control information 1023: special edit information in program chains PGCs (where the relevant time set information and special edit content are written as EDL information), and file conversion information (the information to convert a specific part of an AV file into a file capable of special editing on a PC, such as an AVI (Audio Video Interleaving) file and specify a place to store the converted file.

Figure 4:
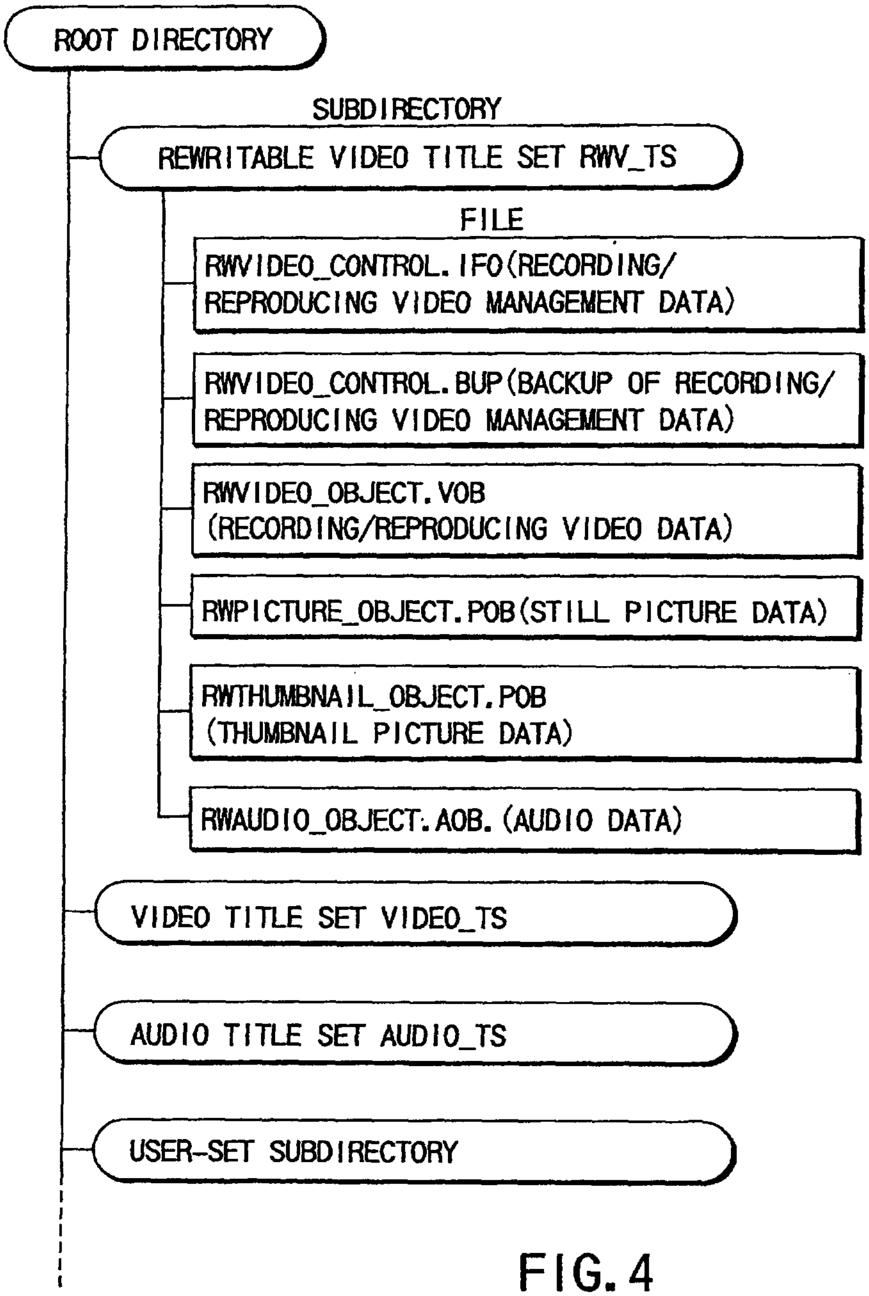
FIG. 4 is a diagram to help explain a directory structure of information (data files) recorded on an optical disk.

FIG. 4 shows a directory structure having only one video file on a single information storage medium of the present invention. The recording/reproducing video data itself in the video object 1012 of FIG. 3D is recorded in the only video file RWVIDEO_OBJECT.VOB of FIG. 4.

The recording/reproducing video management data in the control information 1011 of FIG. 3D is recorded in a file RWVIDEO_CONTROL.IFO and its backup file RWVIDEO_CONTROL.BUP shown in FIG. 4.

The RWVIDEO_CONTROL.BUP is updated each time the contents of RWVIDEO_CONTROL.IFO is updated. In the reproducing, additional recording, partial deleting, or editing of ordinary video information, the RWVIDEO_CONTROL.IFO is used as recording/reproducing video management data. Recordable information storage mediums, such as DVD-RAMS, are more liable to be affected by dust or a flaw on or in the surface of the information storage medium in a playback operation than in a recording operation. Therefore, when there is dust or a flaw on or in the surface, even if the information in the RWVIDEO_CONTROL.IFO has been read accurately, the dust or flaw might sensitively affect the rewriting (or recording) of the information in the RWVIDEO_CONTROL.IFO, making it impossible to update the contents. To overcome this problem, not only the RWVIDEO_CONTROL.IFO containing the management data but also RWVIDEO_CONTROL.BUP containing the same contents as those of the RWVIDEO_CONTROL.IFO are recorded on a recordable information storage medium. This increases the reliability of the recording/reproducing video management data.

The information in the picture object 1013 of FIG. 3D is divided into still picture data and thumbnail picture data, which are recorded in a file RWPICTURE_OBJECT.POB and a file RWTHUMNAIL_OBJECT.POB shown in FIG. 4. The audio object 1014 of FIG. 3D is recorded in a file RWAUDIO_OBJECT.AOB shown in FIG. 4.

The individual files related to a DVD video disk as shown in FIG. 1 are recorded under a subdirectory of video title set VIDEO_TS shown in FIG. 4, although not shown in the figure. According to the information in RWVIDEO_CONTROL.IFO (recording/reproducing video management data), they are linked with RWVIDEO_OBJECT.VOB (recording/reproducing video data) to enable seamless, continuous playback of them.

Figure 5:
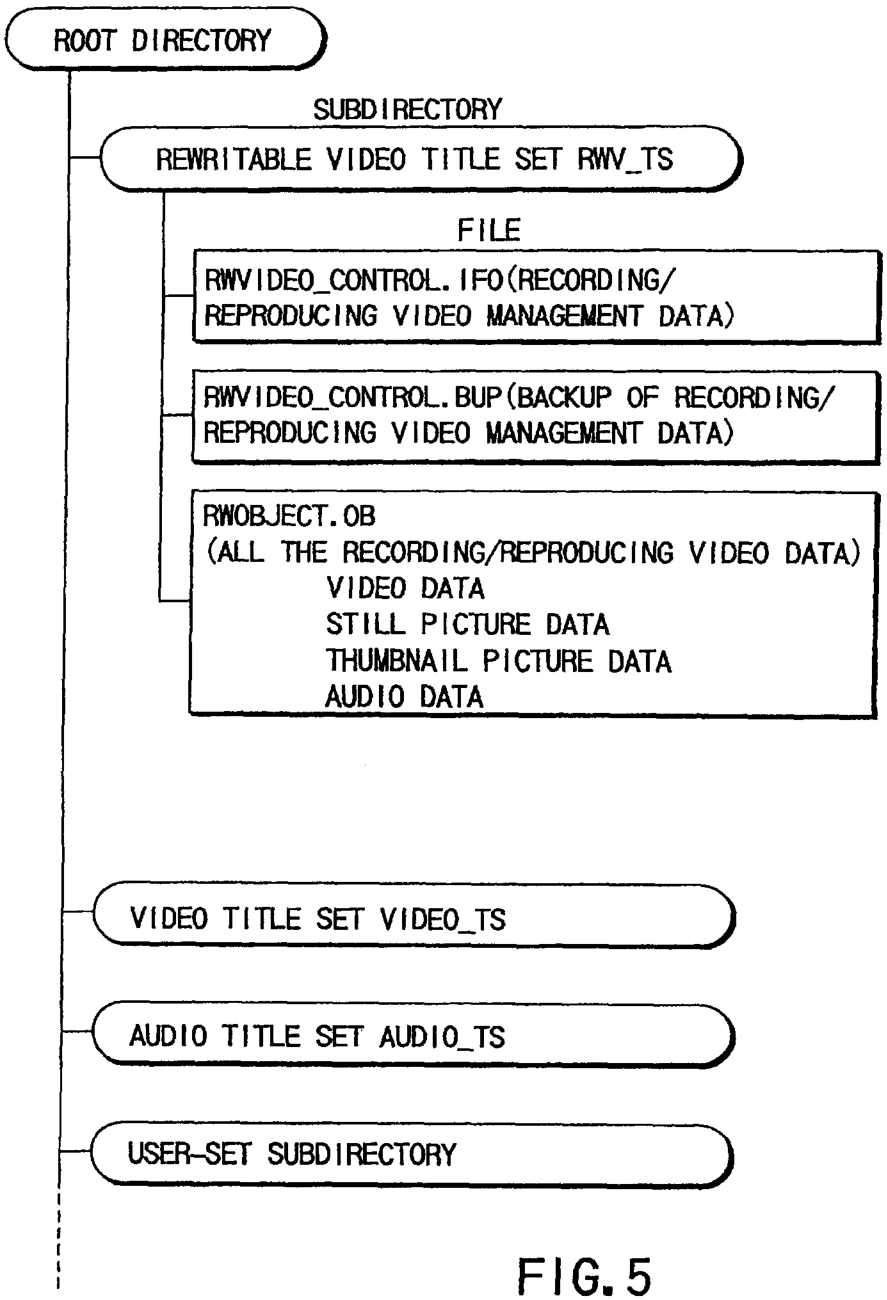
FIG. 5 is a diagram to help explain another directory structure of information (data files) recorded on an optical disk.

FIG. 5 shows another example of the present invention. Specifically, video data, still picture data, thumbnail data, and audio data are all recorded in a single file RWOBJECT.OB. Although all the data for recording and reproducing is recorded in a file, the RWVIDEO_CONTROL.IFO (recording/reproducing video management data) in which the management information including the playback procedure is recorded is recorded in a separate file.

Figure 6:
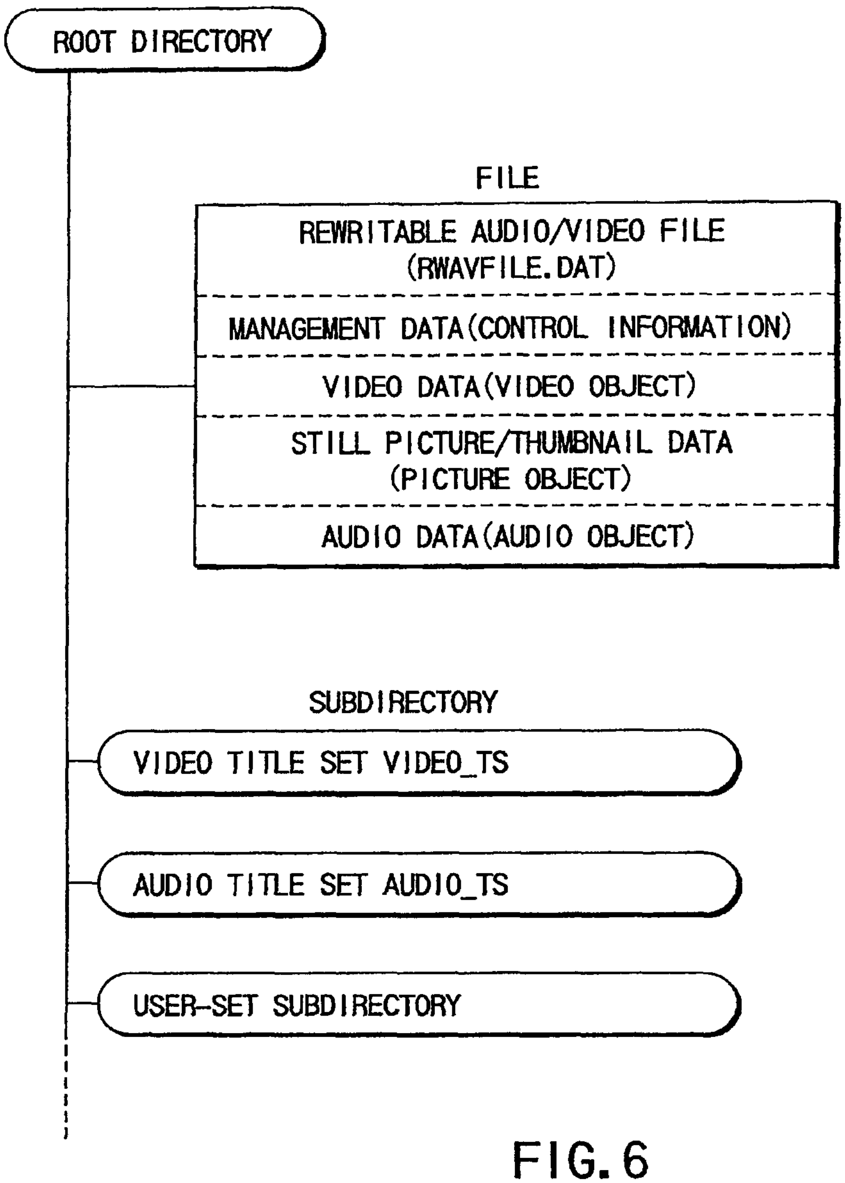
FIG. 6 is a diagram to help explain still another directory structure of information (data files) recorded on an optical disk.
Figure 7:
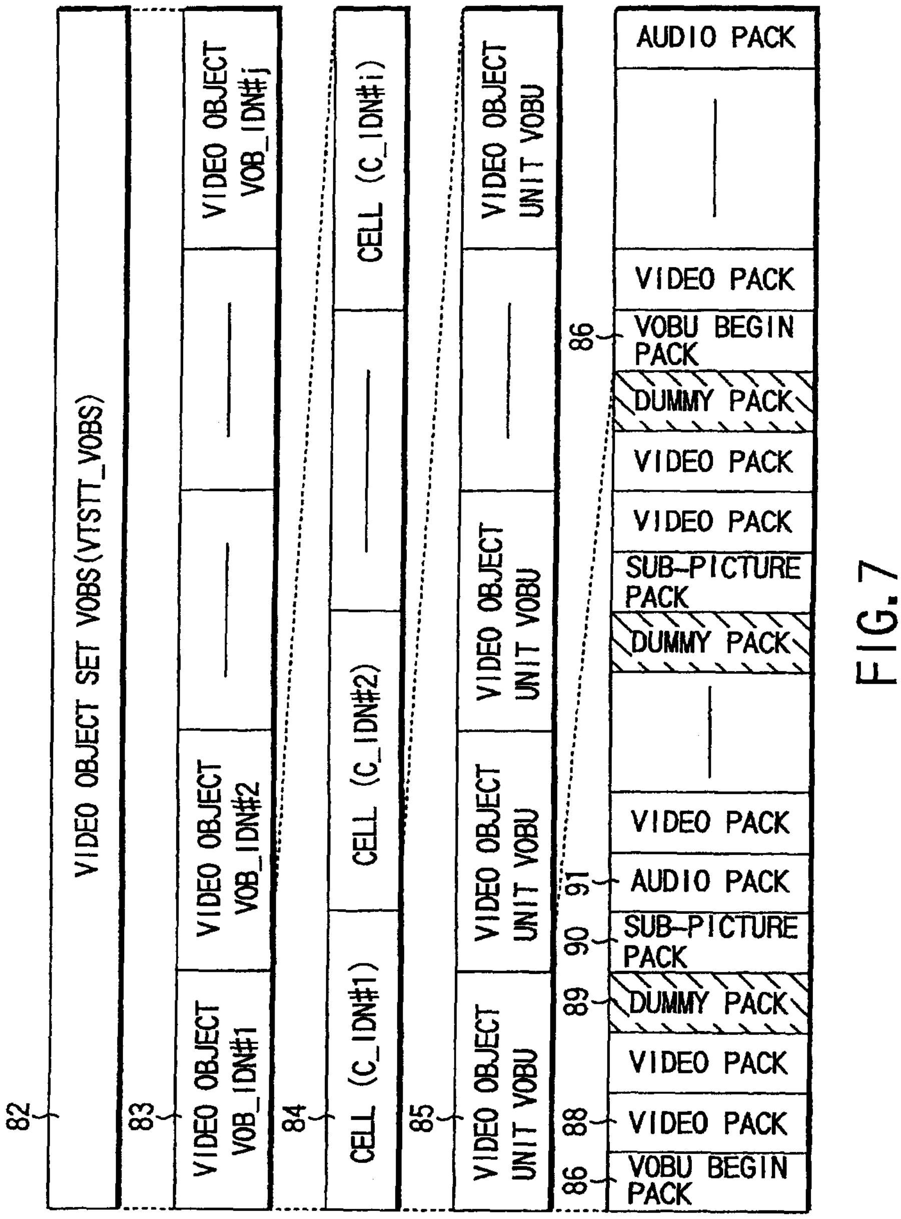
FIG. 7 is a diagram to help explain the relationship between video objects and cells.

FIG. 6 shows another embodiment of the present invention. Unlike the embodiment of FIG. 5, the embodiment of FIG. 6 is such that the video recording/reproducing data including management data is all recorded in a single file RWAVFILE.DAT (Rewritable Audio Video File). In this case, the file RWAVFILE.DAT is placed not under a specific subdirectory but just under the root directory Next, using FIG. 7, the relationship between video objects VOBs and cells will be explained. As shown in FIG. 7, each cell 84 is made up of more than one video object unit VOBU 85. Each video object unit VOBU 85 is a collection (a pack train) of a VOBU begin pack 86, video packs (v packs) 88, sub-picture packs (SP packs) 90, and an audio pack (A pack) 91 in that order, with the VOBU begin pack 86 at the head.

In the VOBU begin pack 86, the time that the video object unit VOBU 85 was recorded on the information storage medium has been recorded in the form of year, month, day of the month, hours, minutes, and seconds. With the recorded time written in the VOBU begin pack 86, when the video object unit VOBU 85 is reproduced, the recorded time reproduced is compared with the date and time that the relevant cell time of FIG. 20 was created or last updated. This makes it possible to check in real time whether the video object unit VOBU 85 currently being reproduced coincides with the video object unit VOBU 85 specified in the cell time general information #m 1116.

As described above, the reliability of the data in playback can be increased by placing the VOBU begin pack 86 at the beginning of the video object unit VOBU 85 and recording the recorded time in the VOBU begin pack 86. Moreover, in the VOBU begin pack 86, information related to the video object unit VOBU 85 automatically created in the microcomputer block 30 of the information recording/reproducing apparatus of FIG. 11 can be recorded. Information used by the information recording/reproducing apparatus is recorded as the information related to the video object unit 85, which helps not only increase the reliability of the reproduced video object unit VOBU 85 but also improve the performance of the apparatus, such as the shortening of the access time. Furthermore, the video data program (EPG) and profile information on the video characters can be recorded as the information related to the video object unit VOBU 85, which helps improve service to the user during video data playback.

Specifically, the video object unit VOBU 85 is defined as a collection of all the packs starting from a VOBU begin pack (navigation pack) 86 to the one just before the next VOBU begin pack (navigation pack) 86. Those packs are used as the smallest units in transferring data. The smallest unit in logical processing is a cell. Logical processing is done in cells.

The playback time of the video object unit VOBU 85 corresponds to the playback time of the video data made up of more than one video group GOP (Group of Picture) contained in the video object unit VOBU 85. The playback time is set to the range from 0.4 second to 1.2 seconds. In the MPEG standard, the playback time of one GOP is normally about 0.5 second. One GOP contains screen data compressed so that about 15 pictures may be reproduced in about 0.5 second When a video object unit VOBU 85 includes video data, GOPs (complying with the MPEG standard) composed of video packs 88, sub-picture packs 90, and audio packs 91 are arranged to produce a video data stream. The video object unit VOBU 85 is determined on the basis of the playback time of the GOPs, regardless of the number of GOPs. At the head of the video object unit VOBU 85, a VOBU begin pack 86 is always placed as shown in FIG. 7.

Even when the playback data contains only audio and/or sub-picture data, it is constructed using a video object unit VOBU 85 as one unit. For example, when a video object unit VOBU 85 is made up of only an audio pack 91, with a VOBU begin pack 86 at the head, the audio pack 91 to be reproduced within the playback time of the video object unit VOBU 85 to which the audio data belongs is stored in the video object unit VOBU 85, as in the video object VOB 83 of video data.

In an information recording and reproducing apparatus capable of recording on an information storage medium a video title set VTS including a video object set VOBS 82 of the structure as shown in FIG. 7, the user often wants to edit the contents of the recording after having recorded the video title set VTS. To meet the desire, dummy packs 89 are allowed to be inserted in each video object unit VOBU 85. The dummy pack 89 can be used later to record editing data.

As shown in FIG. 7, a video object set VTSTT_VOBS 82 is a set of more than one video object VOB 83. The video objects VOBs 83 in a video object set VOBS 82 are used for the same application.

A video object set VOBS 82 for menus is normally made up of one video object VOB 83, in which plural menu screen display data items are stored. In contrast, a video object set VOBS 82 for title sets is normally made up of plural video objects VOBs 83.

When a concert video for a certain rock band is taken as an example, video objects VOBs 83 constituting a video object set VTSTT_VOBS 82 for title sets can be considered as corresponding to the video data for the performance of the band. In this case, by specifying the video objects VOBs 83, for example, the third piece on the band's concert program can be reproduced.

In the video objects VOBs 83 constituting a video object set VTSM_VOBS for menus, the menu data for all the pieces of the bands concert program is stored. According to the menu on the screen, a specific piece of music, for example, an encore, can be reproduced.

In an ordinary video program, one video object set VOBS 82 can be composed of one video object VOB 83. In this case, one video stream is completed with a single video object VOB 83.

On the other hand, for example, in the case of a collection of animations with multiple stories or omnibus movies, plural video streams (plural program chains PGCs) can be provided for each story in one video object set VOBS 82. In this case, each video stream is stored in the corresponding video object VOB 83. At that time, the audio stream and sub-picture stream related to each video stream are also completed in each video object VOB 83. Each video object VOB 83 is assigned an identification number IDN #j (j=1 to j). By the identification number, the video object VOB 83 can be identified. A video object VOB 83 is composed of one or more cells 84. An ordinary video stream is made up of plural cells. A video stream for menus may be composed of one cell 84. Like the video object VOB 83, each cell 84 is assigned an identification number IDN #j (i=1 to j).

The cell time control information 1104 of FIG. 3F is composed of cell time control general information 1111, cell time search information 1112, and one or more pieces of cell time information 1113 to 1115 as shown in FIG. 3G.

Figure 8:
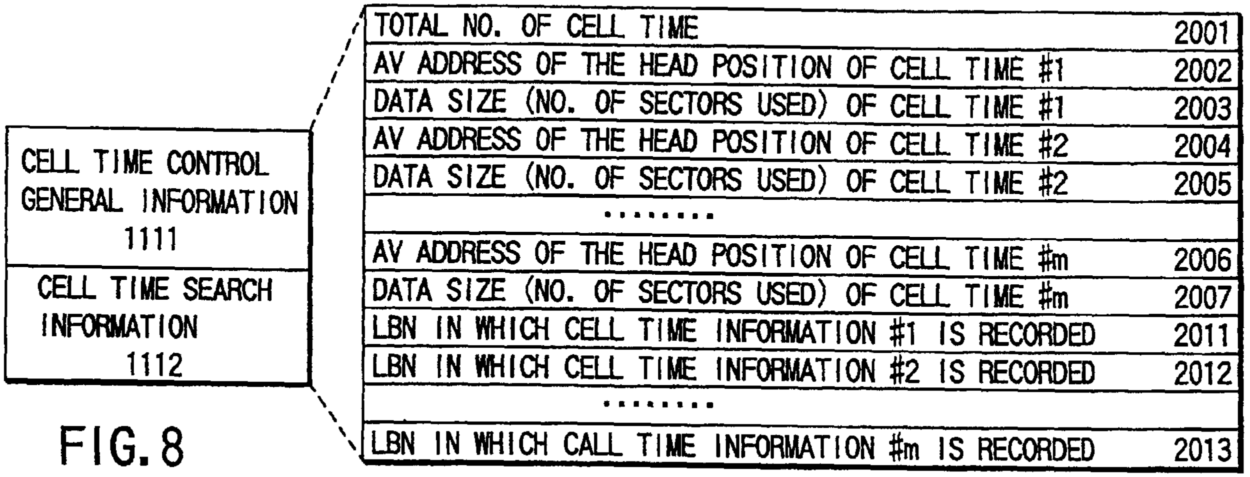
FIG. 8 is a diagram to help explain a data structure of cell time control general information and cell time search information.
Figure 9:
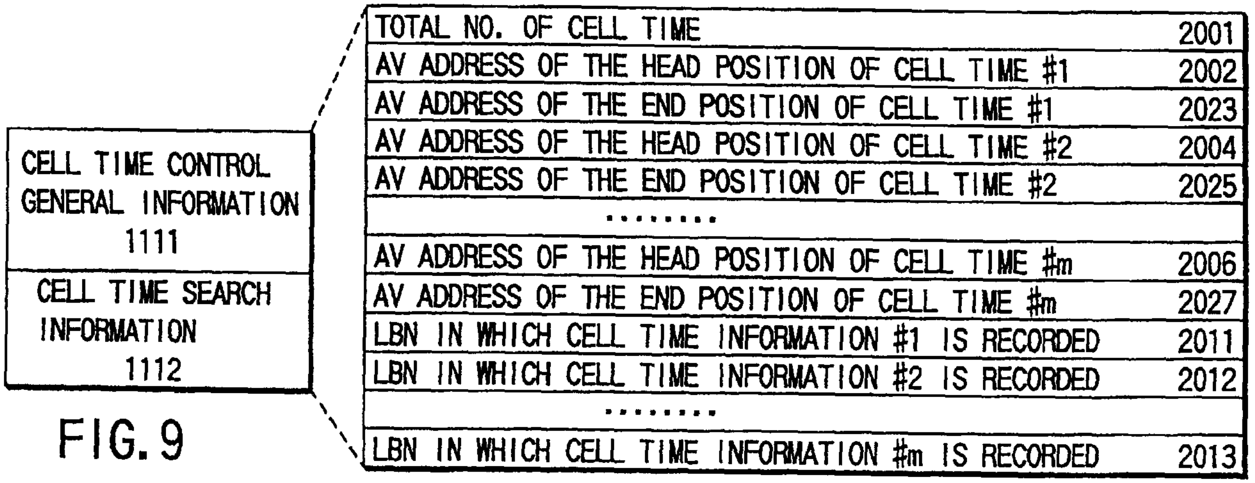
FIG. 9 is a diagram to help explain another data structure of cell time control general information and cell time search information.

Of these, the pieces of cell time information 1113 to 1115 each have cell time general information 1116 and a cell VOBU table 1117 as shown in FIG. 3H. The data structure of the cell time control general information 1111 and that of the cell time search information 1112 are shown in FIGS. 8 and 9, the details of which will be explained later.

The playback sequence of the program chain (PGC) control information 1103 of FIG. 3F is determined by a program chains PGC and cells. The program chain PGC is a unit to execute a series of playback specifying the order in which cells are reproduced. A cell is a playback section specifying playback data by a start address and an end address.

The program chain (PGC) control information 1103 is composed of PGC information management information, one or more pieces of search-pointer-of-PGC information, and PGC information.

The PGC information management information includes information (number-of-PGCs information) on the number of program chains PGCs. The search-pointer-of-PGC information points at the head of each PGC information and makes it easy to search.

The PGC information includes PGC general information and one or more pieces of search-pointer-of-cell-time information. The PGC general information includes the playback time of program chains PGCs and information on the number of cells (search-pointer-of-cell-time information). In the search-pointer-of-cell-time information, the positions of the pieces of cell time information 1113 to 1115 are written.

Figures 2A, 2B:
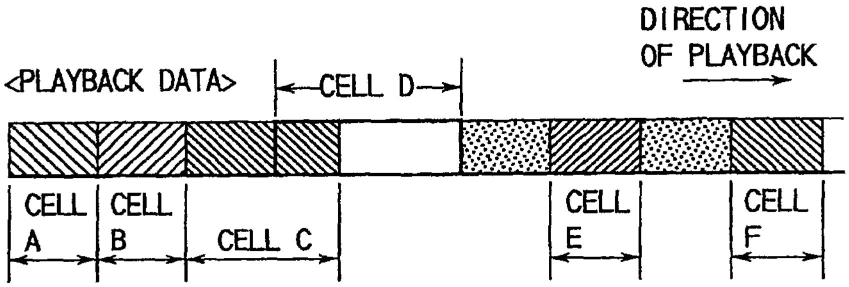
FIGS. 2A and 2B are diagrams to help explain the conventional relationship between cells and PGC information.

An example of reproducing video information using a program chain PGC in a conventional DVD video has been explained in FIGS. 2A and 2B. In the conventional example, all the video information (all the cells) is not necessarily reproduced continuously using a single program chain PGC. Since video information has been recorded in DVD video, the reproducing method of FIGS. 2A and 2B will not give the user a sense of incongruity.

In a video file of the present invention in which the user can record pictures, the user records video information. With the reproducing method as explained in FIGS. 2A and 2B, the user familiar with the VTR is liable to fall into confusion about the relationship between the total video recording time and the remaining time.

On the other hand, with the present invention, the playback sequence is determined in a single program chain PGC so that all the video information in a video file may be reproduced continuously as shown in FIGS. 10A and 10B. As shown in FIG. 10A, on an information storage medium, video objects VOBs are arranged from the inner circumference side of the disk in this order:

VOB_IDN #1→VOB_IDN #3→VOB_IDN #2.

According to this arrangement, cells are arranged from the inner circumference side of the disk in this order:

cell A→cell B→cell C→cell F→cell G→cell D→cell E.

In contrast, a program chain PGC indicating the sequence in which all the cells shown in FIG. 10B are reproduced consecutively reproduces cells in this order:

cell A→cell B→cell C→cell D→cell E→cell F→cell G.

Figure 11:
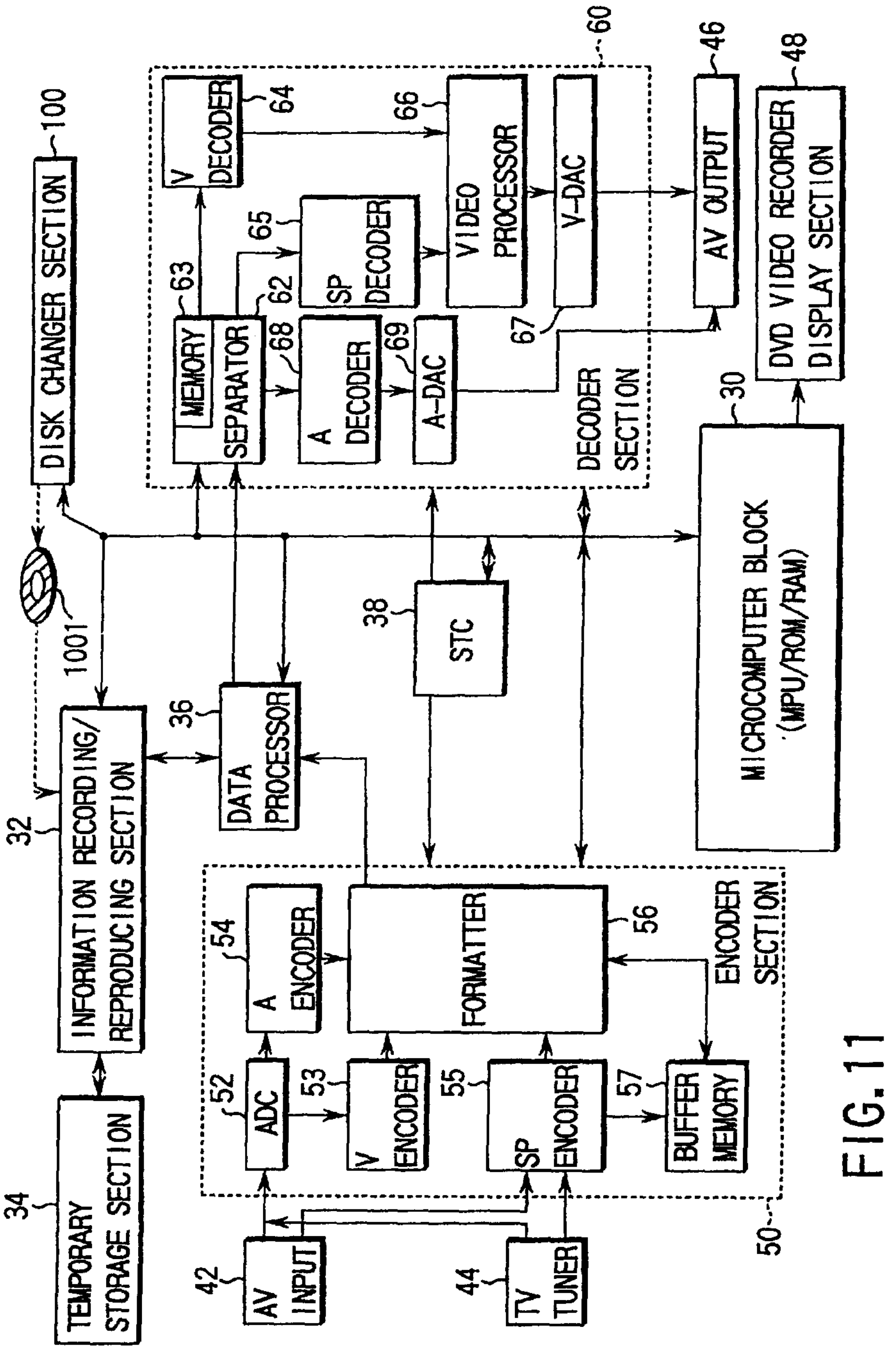
FIG. 11 is a block diagram of an information recording/reproducing apparatus for optical disks.

FIG. 11 shows the configuration of an information recording/reproducing apparatus which records and reproduce information on and from an information storage medium having video files shown in FIG. 1 or 4. The information recording/reproducing apparatus comprises the following main component parts: an information recording/reproducing section 32 that rotates an optical disk 1001 acting as an information storage medium having video files and reads and writes information from and onto the optical disk 1001, an encoder section 50 constituting the video recording side, a decoder section 60 constituting the reproducing side, and a microcomputer block 30 that controls the operation of the main part of the apparatus.

The encoder section 50 includes an ADC (Analog Digital Converter) 52, a V (Video) encoder 53, an A (Audio) encoder 54, an SP (Sub-picture) encoder 55, a formatter 56, and a buffer memory 57.

The ADC 52 receives an external analog video signal+an external analog audio signal from an AV input section 42 or an analog TV signal+an analog audio signal from a TV (Television) tuner 44. The ADC 52 converts the inputted analog video signal into a digital signal at, for example, a sampling frequency of 13.5 MHz, with the number of quantization bits being eight. Specifically, luminance component Y, color difference component Cr (or Y-R), and color difference component Cb (or Y-B) are each quantized in eight bits.

Similarly, the ADC 52 converts the inputted analog audio signal into a digital signal at, for example, a sampling frequency of 48 KHz, with the number of quantization bits being 16.

When the analog video signal and digital audio signal are inputted to the ADC 52, the ADC 52 allows the digital audio signal to pass through. The ADC 52 may reduce only jitters incidental to the digital audio signal or change the sampling rate or the number of quantization bits without changing the contents of the digital audio signal.

On the other hand, when the digital video signal and digital audio signal are inputted to the ADC 52, the ADC 52 allows the digital video signal and digital audio signal to pass through. In this case, too, the ADC 52 may reduce jitters or change the sampling rate without changing the contents of the digital video signal and digital audio signal.

The digital video signal outputted from the ADC 52 is sent to the formatter 56 via the v encoder 53. The digital audio signal outputted from the ADC 52 is sent to the formatter 56 via the A encoder 54.

The v encoder 53 has the function of converting the inputted digital video signal into a digital signal compressed at a variable bit rate according to the MPEG-2 or MPEG-1 standard.

The A encoder 54 has the function of converting the inputted digital audio signal into a digital signal compressed at a fixed bit rate or a linear PCM digital signal according to the MPEG or AC-3 standard.

When the sub-picture information is inputted from the AV input section 42 (e.g., the signal from a DVD video player with an independent output terminal for sub-picture signal), or when a DVD video signal with such a data structure is broadcast and then received by the TV tuner 44, the sub-picture signal (sup-picture pack) in the DVD video signal is inputted to the SP encoder 55. The sup-picture signal inputted to the SP encoder 55 is arranged into a specific signal form, which is sent to the formatter 56.

The formatter 56 subjects the inputted video signal, audio signal, and sup-picture signal to specific processes using the buffer memory 57 as a work area and outputs the recording data conforming to the format (file structure) explained in FIG. 7 to a data processor 36.

Here, a standard encode process for creating the recording data will be explained briefly. In the encoder section 50 of FIG. 11, when the encode process is started, the parameters necessary to encode the video (main picture) data and audio data are set.

Next, by pre-encoding the main picture data using the set parameters, the distribution of the amount of codes best suitable for the set average transfer rate (recording rate) is calculated. In this way, the encoding process of the main picture data is executed on the basis of the amount-of-codes distribution calculated in the pre-encoding process. At that time, the encoding process of the audio data is executed at the same time.

When the amount of data compression is insufficient as a result of the pre-encoding process (or when the desired video program does not fit in an information storage medium), if the pre-encoding process can be executed again (e.g., the video recording source is a repeatedly reproducible source, such as video tape or a video disk), part of the main picture data is encoded again and the re-encoded part of the main picture data is replaced with the main picture data portion previously pre-encoded. By such a series of processes, the main picture data and audio data are encoded, thereby reducing remarkably the value of the average bit rate necessary for recording.

Similarly, the parameters necessary to encode the sup-picture data are set and the encoded sup-picture data is produced.

The encoded main picture data, audio data, and sup-picture data are combined and formatted into the structure of the video title set VTS.

Specifically, a cell is set as the smallest unit of the main picture data (video data). Then, the cell time information as shown in FIGS. 8 and 9 is created as described later. Next, the structure of cells constituting a program chain PGC as shown in FIGS. 10A and 10B and the attributes of the main picture, sub-picture, and audio are set, thereby creating a recording/reproducing video management data file RWVIDEO_CONTROL.IFO including various pieces of information.

The encoded main picture data, audio data, and sup-picture data are divided into packs of a constant size (2048 bytes) as shown in FIG. 7. Dummy packs 89 are inserted in the packs whenever necessary. In the packs other than the dummy packs 89, time stamps, including PTS (Presentation Time Stamp) and DTS (Decoding Time Stamp), are written whenever necessary. For the PTS of a sub-picture, the time delayed an arbitrary time from the PTS of the main picture data or audio data in the same playback time zone can be written.

Then, a VOBU begin pack (navigation pack) 86 is placed at the head, followed by cells, in a video object unit VOBU 85 unit, which thereby creates a video object VOB 83 composed of plural cells. One or more of the video object VOB 83 are gathered together to form a video object set VOBS 82, which is recorded in the recording/reproducing video data file RWVIDEO_OBJECT.VOB of FIG. 4.

When the DVD playback signal is digital copied from a DVD video player, the contents of the cells, program chains, management tables, and time stamps need not be created again, because they have been determined already. However, to construct a DVD video recorder so that it enables a digital copy of the DVD playback signal, electronic watermarks or other copyright protecting means have to be provided.

A disk drive section that reads and writes (video records and/or reproduces) information from and onto an information storage medium (or optical disk 1001) includes a disk changer section 100, an information recording/reproducing section 32, a temporary storage section 34, a data processor 36, and an STC (System Time Counter or System Time Clock) 38.

The temporary storage section 34 is used to buffer a constant amount of the data (the data outputted from the encoder section 50) written onto an information storage medium (optical disk 1001) via the information recording/reproducing section 32 or to buffer a constant amount of the data (the data inputted to the decoder section 60) reproduced from the information storage medium (optical disk 1001) via the information recording/reproducing section 32.

For example, when the temporary storage section 34 is composed of a 4-Mbyte semiconductor memory (D-RAM (dynamic RAM)), about eight seconds of recording or playback data can be buffered at a recording rate of an average of 4 Mbps (bit per second). When the temporary storage section 34 is composed of a 16-Mbyte EEP (Electrically Erasable and Programmable) ROM (flash memory), about 30 seconds of recording or playback data can be buffered at a recording rate of an average of 4 Mbps. Furthermore, when the temporary storage section 34 is composed of a 100-Mbyte ultra-compact HDD (hard Disk Drive), about three minutes or more of recording or playback data can be buffered at a recording rate of an average of 4 Mbps.

When the information storage medium (optical disk 1001) is used up in the course of video recording, the temporary storage section 34 may store temporarily the video information until the information storage medium (optical disk 1001) has been replaced with a new one.

Furthermore, when a high-speed drive (a double-speed drive or faster drive) is used as the information recording/reproducing section 32, the temporary storage section 34 can be used to store temporarily the data read beyond the capacity of the ordinary drive within a specific time. Once the data read during playback has buffered in the temporary storage section 34, even when the optical head (not shown) has made an error in reading due to vibrational shocks, use of the reproduced data buffered in the temporary storage section 34 prevents the reproduced pictures from being interrupted.

Although not shown in FIG. 11, making an external card slot in the information recording/reproducing apparatus would enable the EEPROM to be sold separately as an optional IC (Integrated Circuit) card. Moreover, providing the information recording/reproducing apparatus with an external drive slot or a SCSI (Small Computer System Interface) would enable the HDD to be sold separately as an optional extension drive.

Under the control of the microcomputer block 30, the data processor 36 of FIG. 11 supplies the DVD recording data outputted from the encoder section 50 to the information recording/reproducing section 32, receives the DVD playback signal reproduced from the information storage medium (optical disk 1001) from the information recording/reproducing section 32, rewrites the management information recorded on the information storage medium, or deletes the data (files or video title sets VTSs) recorded on the information storage medium.

The microprocessor block 30 includes an MPU (Micro Processing Unit) (or a CPU (Central Processing Unit)), a ROM in which control programs have been written, and a RAM for providing the necessary work area to execute programs.

The MPU of the microcomputer block 30 uses the RAM as a work area according to the control programs stored in the ROM and effects faulty place sensing, unrecorded area sensing, video recording information recording position setting, UDF recording, AV address setting, and others.

Of the results of execution by the MPU, the contents that should be reported to the user of the information recording/reproducing apparatus are displayed on either the display section 48 of the DVD video recorder or on the screen of a monitor display (OSD).

The timing for the microcomputer block 30 to control a disk changer section 100, the information recording/reproducing section 32, the data processor 36, and the encoder section 50 and/or decoder section 60 may be based on the time data from the STC 38. The recording and reproducing operations are generally executed in synchronization with the time clock from the STC 38. The other processes may be executed with the timing independent of the STC 38.

The decoder section 60 includes the following: a separator 62 that separates each pack from the video information having the pack structure of FIG. 7, a memory 63 used in executing the pack separation and other signal processes, a v decoder 64 that decodes the main picture data (the contents of the video packs 88 in FIG. 7) separated by the separator 62, an SP decoder 65 that decodes the sup-picture data (the contents of the sup-picture packs in FIG. 7) separated by the separator 62, an A decoder 68 that decodes the audio data (the contents of the audio packs 91 in FIG. 7) separated by the separator 62, a video processor 66 that combines the main picture data from the V decoder 64 with the sub-picture data from the SP decoder 65 to superimpose sub-pictures including menus, highlight buttons, and subtitles on the main picture, a V-DAC 67 that converts the digital video output from the video processor 66 into an analog video signal, and an A-DAC 69 that converts the digital audio output from the A decoder 68 into an analog audio signal.

The analog video signal from the V-DAC 67 and the analog audio signal from the A-DAC 69 are supplied to an external component (a multi-channel stereo unit (e.g., a 2-channel to 6-channel stereo unit)+a monitor TV or a projector) (not shown).

The OSD display data from the microcomputer block 30 is inputted to the separator 62 of the decoder section 60 and passes through the V decoder 64 (which does not decode it). The OSD display data is then inputted to the video processor 66. Then, the OSD display data is superimposed on the main picture. The resulting picture is supplied to an external monitor TV connected to the AV output section 46. This enables a warning message to be displayed together with the main picture.

When a DVD-RAM disk is used as an information storage medium for recording video files, the UDF is often used as a file format. Therefore, the contents of the UDF will be described by reference to FIGS. 12A to 17.

(A) Rough Explanation of UDF (A-1) What is UDF?

UDF is an abbreviation of universal disk format. It shows the rule for a file management method mainly in a disk-like information storage medium. The CD-ROM, CD-R, CD-RW, DVD video, DVD-ROM, DVD-R, and DVD-RAM employ the UDF format standardized by ISO 9660.

The file management system is based on the assumption that a hierarchical file system which basically has a root directory as a parent and manages files in a tree-like manner. The UDF format chiefly complying with the DVD-RAM standard (File System Specifications) will be explained. Most part of the explanation below applies to the DVD-ROM standard.

(A-2) Summary of UDF (A-2-1) The Contents of File Information Recorded on an Information Storage Medium A collection of information is called file data. When information is recorded on an information storage medium, recording is done in units of file data. To distinguish one collection of file data from another, each collection of file data is assigned a unique file name. Grouping plural collections of file data having the common contents of information facilitates file management and file retrieval. A group of collections of file data is called a directory or a folder. Each directory is assigned a unique directory name (or folder name).

Furthermore, plural directories (or folders) can be put together into a higher-order directory (or higher-order folder) as a group at the preceding level of hierarchy. Here, the file-data and the directory (folder) are generically called files.

When information is recorded, the following pieces of information are recorded on an information storage medium:

The Contents of Collections of File Data

File Name Corresponding to Each Collection of File Data

Storage place of each collection of file data (Under which directory each collection of file data is recorded).

In addition, the following pieces of information on each directory (or folder) are recorded on the information storage medium:

Directory Name (of Folder Name)

Position to which each directory (or folder) belongs (position of the higher-order directory (or higher-order folder) serving as their parent).

(A-2-2) Information Recording Format on an Information Storage Medium

All the recording area on the information storage medium is divided into logical sectors using 2048 bytes as the smallest unit. All the logical sectors are assigned logical sector serial numbers. When information is recorded on the information storage medium, information is recorded in logical sectors. The recording places on the information storage medium are managed by the logical sector numbers of the logical sectors in which the information has been recorded.

As shown in FIGS. 12A, 12B, 13A and 13B, the logical sectors in which information on the file structure 486 and file data 487 have been recorded are called logical blocks. The logical blocks are assigned logical block numbers (LBNs) in connection with the logical sector numbers (LSNs). The length of the logical block is set to 2048 bytes as that of the logical sector is.

(A-2-3) An Example of a Simplified Hierarchical File System

Figure 14:
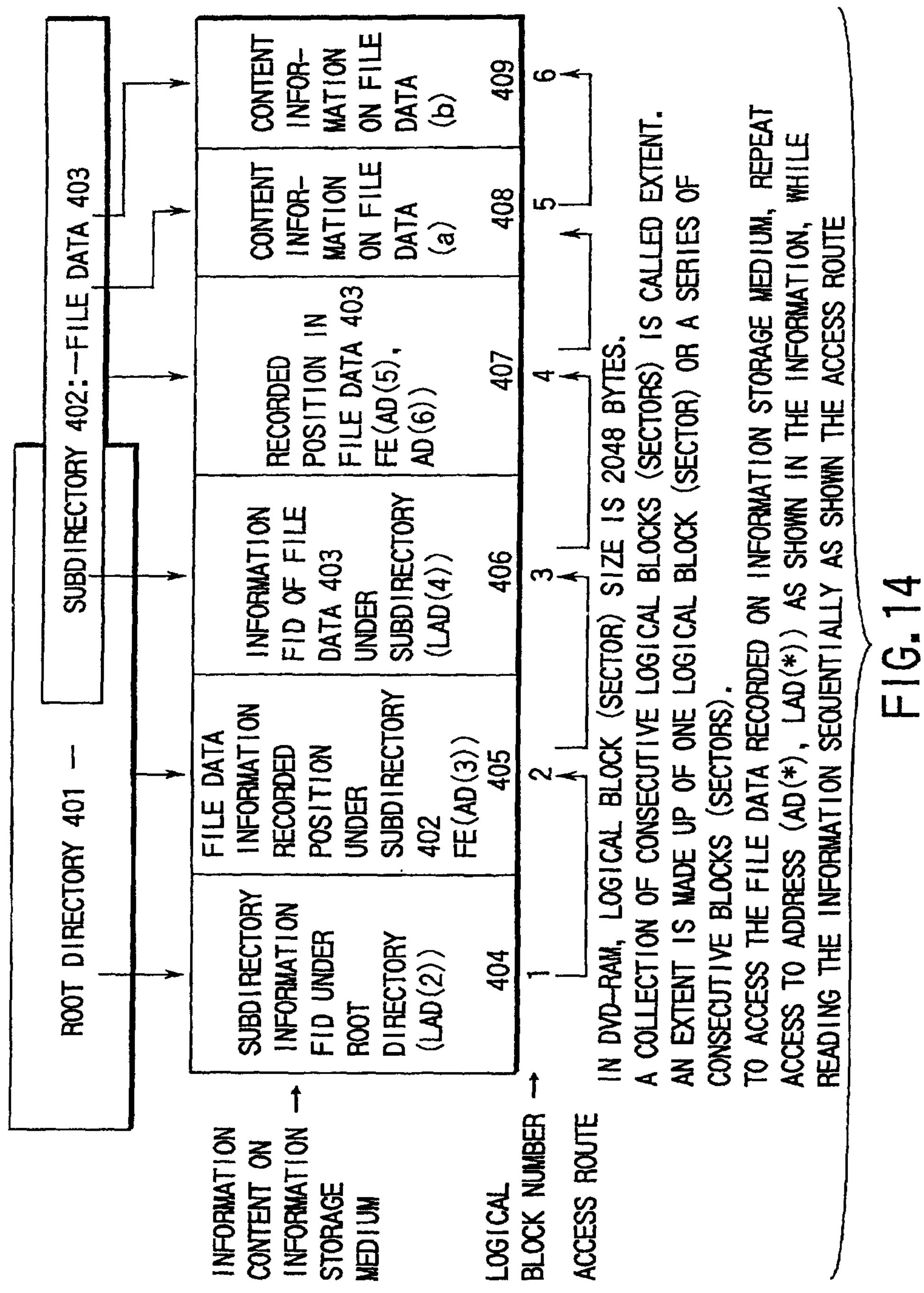
FIG. 14 is a diagram to help explain the basic relationship between the hierarchical file system of FIG. 4 and the contents of the information recorded on the optical disk.

FIG. 14 shows an example of a simplified hierarchical file system. Most OS file management systems, including UNIX, Mac OS, MS-DOS, Windows, have a tree-like hierarchical structure.

Each disk drive (e.g., when a single HDD is divided into plural partitions, each partition corresponds to each disk drive) has one root directory 401 serving as a parent for all this disk drive. To the root directory, subdirectories 402 belong. The subdirectories 402 contains collections of file data 403.

In addition to the example, there may be a case where a collection of file data 403 exists just under the root directory 401 or plural subdirectories 402 are connected in series to form a complex hierarchical structure.

(A-2-4) The Contents of File Management Information Recorded on an Information Storage Medium The file management information is recorded in logical blocks. The contents recorded in each logical block are chiefly the following:

Descriptive statement FID (File Identifier Descriptor) indicating information on files.

It describes the types of file and file names (such as the root directory name, subdirectory names, and file data names). In the FID, a descriptive statement indicating the contents of the subsequent collection of file data and the recorded place of the contents of the directories (that is, the recorded places of the FE corresponding the relevant file explained below) is also written.

Descriptive Statement FE (File Entry) Indicating the Recorded Place of the Contents of Files Places on an information storage medium on which information on the contents of collections of file data and on the contents of directories (subdirectories) has been recorded are written.

FIG. 15 shows an excerpt of the descriptive contents of the file identifier descriptor. The details of it will be explained under (B-4) File identifier descriptor. FIG. 16 shows an excerpt of the descriptive contents of the file entry. The details of it will be explained under (B-3) File entry.

The descriptive statement indicating the recorded places on the information storage medium uses a long allocation descriptor and a short allocation descriptor of FIG. 17. The details of the short allocation descriptor will be explained under (B-1-3) Short allocation descriptor.

As an example, the descriptive contents of information on the file system structure of FIG. 14 recorded on an information storage medium are as follows:

The contents of the root directory 401 are written in the logical block with logical block number 1.

In the example of FIG. 14, the root directory 401 contains only a subdirectory 402. As a result, information on the subdirectory 402 is written in a file identifier descriptor statement 404 as the contents of the root directory 401. Although not shown, information on the root directory 401 itself is also written in a file identifier descriptor statement in the same logical block.

Furthermore, in the file identifier descriptor statement 404 of the subdirectory 402, the recorded place of the file entry statement 405 (in the example of FIG. 14, the second logical block) indicating where the contents of the subdirectory 402 are recorded is written in a long allocation descriptor statement (LAD (2)).

In the logical block with logical block number 2, a file entry statement 405 indicating the place in which the contents of the subdirectory 402 are recorded is recorded.

In the example of FIG. 14, the subdirectory 402 contains only collections of file data 403. As a result, the recorded place of a file identifier descriptor statement 406 indicating information on the collections of file data 403 is essentially written as the contents of the subdirectory 402.

Furthermore, in the short allocation descriptor statement in the file entry statement, it is written that the contents of the subdirectory 402 are recorded in the third logical block (AD (3)).

The contents of the subdirectory 402 are recorded in the logical block with logical block number 3.

In the example of FIG. 14, the subdirectory 402 contains only collections of file data 403. As a result, information on the collections of file data 403 are written in a file identifier descriptor statement 406 as the contents of the subdirectory 402. Although not shown, information on the subdirectory 402 itself is also written in a file identifier descriptor statement in the same logical block.

Furthermore, in the file identifier descriptor statement 406 about the collections of file data 403, the recorded place of the file entry statement 407 indicating where the contents of the collections of file data 403 (in the example of FIG. 14, they are recorded in the forth logical block) are recorded is written in a long allocation descriptor statement (LAD (4)).

In the logical block with logical block number 4, a file entry statement 407 indicating the place in which the contents 408, 409 of the collections of file data 403 are recorded is recorded.

In the short allocation descriptor statement in the file entry statement 407, it is written that the contents 408, 409 of the collections of file data 403 are recorded in the fifth and sixth logical blocks ((AD(5), AD(6)).

In the logical block with logical block number 5, information (a) 408 on the contents of the collection of file data 403 is recorded.

In the logical block with logical block number 6, information (b) 409 on the contents of the collection of file data 403 is recorded.

(A-2-5) Method of Accessing File Data According to the Information Shown in FIG. 14

As explained briefly under (A-2-4) The contents of file management information recorded on an information storage medium, in the file identifier descriptors 404, 406 and the file entries 405, 407, the logical block numbers indicating the pieces of information that follow those contents are written.

Just as a collection of file data is reached via subdirectories, starting from the root directory and going down levels of hierarchy, the contents of the collection of file data—are accessed by reproducing the pieces of information in logical blocks on the information storage medium in sequence according to the logical block numbers written in the file identifier descriptor and file entry.

Specifically, to access the collection of file data 403 according to the information shown in FIG. 14, the first logical block information is first read. Since the collection of file data 403 exists in the subdirectory 402, the first logical block information is searched for the file identifier descriptor 404 of the subdirectory 402. After LAD (2) has been read, the second logical block information is read according to LAD (2).

Because only one file entry statement is written 5 in the second logical block, AD (3) is read from the block and control goes to the third logical block. The third logical block is searched for the file identifier descriptor 406 written about the collection of file data 403. Then, LAD (4) is read. According to LAD (4), control proceeds to the fourth logical block. Because only one file entry statement 407 is written in the fourth logical block, AD (5) and AD (6) are read and the logical block numbers (5 and 6) in which the contents of the collection of file data 403 are recorded is found.

The contents of AD (*) and LAD (*) will be explained in detail under (B) Concrete description of the contents of each descriptive statement in the UDF. (A-3) Features of the UDF (A-3-1) Explanation of the Features of the UDF The features of the UDF will be explained in comparison with the FAT used in the HDD, FDD (Floppy Disk Drive), and MO (Magneto optics):

(1) The LDF has large minimum units (including the minimum logical block size and the minimum logical sector size) and suitable to record video information or music information that has a large amount of information to be recorded.

Specifically, the size of a LDF logical sector (block) is as large as 2048 bytes, whereas the size of a FAT logical sector is 512 bytes.

(2) With the UDF, the file management information can be recorded in a distributed manner at arbitrary places on the disk, whereas with the FAT, a management table (file allocation table) for allocating files to the information storage medium is recorded intensively in a local place on the information storage medium.

Specifically, with the UDF, the recorded places on the disk concerning the file management information and file data are written as logical sector (block) numbers in the allocation descriptor.

With the FAT, the file management information is controlled centrally in the file management area (file allocation table). Therefore, the FAT is suitable for an application that needs to change the file structure frequently (particularly to rewrite frequently). Since the FAT is recorded in a local place, it is easy to rewrite the management information. Furthermore, since the recorded place of the file management information (file allocation table) has been determined, the recording medium is required to have high reliability (e.g., have no defective area).

Since, with the UDF, the file management information is distributed over the disk, this leads to few great changes in the file structure. Therefore, the UDF is suitable for an application where new file structures are added later (particularly a postscript application). Namely, In adding a file structure, the present file management information has only to be changed in fewer places.

Since the recording places of the distributed file management information can be specified arbitrarily, recording can be done avoiding congenital defective portions. Recording the file management information in arbitrary places also enables all the file management information to be concentrated in one place, which is the advantage of the FAT. Consequently, the UDF can be considered to be a more versatile file system.

(B) Concrete Description of the Contents of Each Descriptive Statement (Descriptor) in the UDF (B-1) Descriptive Statement of Logical Block Number (B-1-1) Allocation Descriptor As described under (A-2-4) The contents of file management information recorded on an information storage medium, a descriptive statement that is part of a file identifier descriptor or a file entry and describes the place (logical block number) in which the information following that file identifier descriptor or file entry is recorded is called a allocation descriptor. There are two types of allocation descriptor: a long allocation descriptor and a short allocation descriptor.

(B-1-2) Short Allocation Descriptor

As shown in FIG. 17, in the length of extent 410, the number of logical blocks is expressed in four bytes. In the position of extent 411, the relevant logical block number is expressed in four bytes. In the descriptive statement, the description is simplified and written in AD (logical block number).

(B-2) Unallocated Space Entry

This is a descriptive statement that writes the unrecorded extent distribution on an information storage medium in a short descriptor for each extent and arranges the descriptors. It is used in a space table (see FIGS. 12A, 12B, 13A and 13B). Specifically, in this statement, a descriptor tag (representing the identifier for the contents of the description), an ICB tag (representing the file type), and the total length of the allocation descriptor train (the total number of bytes in four bytes) are written. The file type=1 in the ICB tag means an unallocated space entry. The file type=4 means a directory and the file type=5 means file data.

(B-3) File Entry

This is the statement explained under (A-2-4) The contents of file management information recorded on an information storage medium. As shown in FIG. 16, in this statement, the following are written: a descriptor tag 417 (representing the identifier for the contents of the description, 261 in this case), an ICB tag 418 (representing the file type, its contents being the same as (B-2)), permission 419 (representing information on permission to record, reproduce, and delete for each user, mainly used for assuring file security), and an allocation descriptor 420 (writing the location in which the contents of the relevant file are recorded for each extent by placing short allocation descriptors side by side).

(B-4) File Identifier Descriptor

This is the statement explained under (A-2-4) The contents of file management information recorded on an information storage medium. As shown in FIG. 15, in this statement, the following are written: a descriptor tag 421 (representing the identifier for the contents of the description, 257 in this case), file characteristic 422 (representing the type of file, meaning one of parent directory, directory, file data, and file delete flag), an information control block 423 (the FE location corresponding to the file is written in a long allocation descriptor), a file identifier 424 (directory name or file name), padding 437 (dummy areas added to adjust the total length of the file identifier descriptor, in all of which "0" is normally written). There are two methods of managing the unrecorded locations on an information storage medium:

Space Bit Map Method

A recorded flag or an unrecorded flag is set in a bit map manner for all the logical blocks in the recording area on the information storage medium using the space bit map descriptor 470 (see FIGS. 12A and 12B).

Space Table Method

All the unrecorded logical block numbers are written as a list of short allocation descriptors using the form of writing an unallocated space entry 471 (see FIGS. 12A and 12B).

In the embodiment, the two methods are written in FIGS. 12A, 12B, 13A and 13B for the sake of explanation. Actually, however, both of the methods are hardly used (recorded on the information storage medium) at the same time. Only one of the methods is used.

An outline of the contents of the principal directories written in FIGS. 12A, 12B, 13A and 13B is as follows:

Beginning extent area descriptor 445 . . . Indicates the start position of volume recognition sequence 444.

Volume structure descriptor 466 Describes the contents of the volume 444.

Boot descriptor 447 . . . Describes the contents of processing in a boot operation.

Terminating extent area descriptor 448 . . . Indicates the end position of the volume recognition sequence 444.

Partition descriptor 450 . . . Indicates the partition information (including size). As a general rule, the DVD-RAM has one partition per volume.

Logical volume descriptor 454 . . . Describes the contents of the logical volume.

Anchor volume descriptor pointer 458 . . . Indicates the recorded locations of the main volume descriptor sequence 449 and reserve volume descriptor sequence 467.

Reserved (00 h bytes all) 459 to 465 . . . Records specific descriptors. To secure logical sector numbers, adjusting areas in all of which "0" is recorded are provided between them.

Reserve volume descriptor sequence 467 Serves as a backup area for the information recorded in the main volume descriptor sequence 449.

Using FIGS. 18A to 18D, a file position setting method in a conventional method that has no unrecorded area in a video file will be explained. Consider a case where two PC files and a single video file have been recorded in the data area 1004 on an information storage medium as shown in FIG. 18A. In FIGS. 18A to 18D, LBN means a logical block number.

When the LBNs at the start position of the individual files are A, F, and C, the recording positions on the file entry of a PC file are FE[AD(A)] and FE[AD(F)] respectively by using the notations in FIGS. 12A, 12B, 13A and 13B or FIGS. 14 and 16. Since in FIG. 18A, video file #1 is recorded together in one place, this makes it possible to write using one extent. As a result, the file entry corresponding to the file is FE[AD(C)].

Next, consider a case where the logical blocks with LBNs from D to E in video file #1 are erased. With the conventional method, an unrecorded area is not allowed to exist in a file. Therefore, the recorded place in video file #1 on the information storage medium is divided into two places, as shown in FIG. 18B.

As a result, since the extent describing the allocation (recording positions) of the video file is divided in two, the file entry for the video file is FE[AD(C), AD(E)]. Under the UDF, the continues recording and playback of video information are not managed. At the stage in FIG. 18B, the areas with the LBNs from D to E are considered as an unrecorded area and the recording of another file into the area is permitted. For this reason, PC file #3 may be recorded in the unrecorded area as shown in FIG. 18C.

In a case where another piece of video information cannot be recorded in the logical blocks with the LBNs from D to E, regardless of an attempt to record the piece of video information, it is recorded as video file #2, another video file, in the place with the LBNs starting at G, far away from video file #1, as shown in FIG. 18D. Specifically, with the conventional method that permits no unrecorded area to exist, video files are scattered over the information storage medium. When all the video files are reproduced continuously, continuous playback is difficult because of the access time of the optical head. Similarly, with the conventional method, continues recording is difficult.

Using FIGS. 19A to 19D, a method, related to the present invention, of setting a file recording position on the information storage medium in a case where an unrecorded area is allowed to exist in a video file will be explained. FIG. 19A corresponds to FIG. 18A. In the embodiment, when the logical blocks with the LBNs from D to E are erased, the file size of the video file does not change because video file #1 has an unrecorded area as shown in FIG. 19B. The file entry to the video file remains unchanged, FE[AD(C)]. As a result, when a new PC file is recorded, any PC file will not be inserted into video file #1, as shown in FIG. 19C.

Furthermore, when video information is additionally recorded by video recording, the additional recording information is recorded in the unrecorded area with the LBNs from D to E. The unrecorded area then changes to an additional recording area. As described above, with the information recording/reproducing apparatus of FIG. 11, the file system information about the UDF need not be changed each time a small part of the video information is erased or additional recording is done by video recording. This facilitates the processing of the information recording/reproducing apparatus. Moreover, when the amount of video information increases, the video file size becomes larger.

That is, the unrecorded area with the LBNs from B to C of FIG. 19C is absorbed by video file #1. While the video file of FIG. 19C has only one extent AD(C), the video file of FIG. 19D has an additional extent AD(A), providing a file entry of FE[AD(C), AD(B)].

Information about each cell of FIG. 10 is recorded in the cell time control information 1104 as shown in FIG. 3F. As shown in FIG. 3G, its contents is made up of the following Cell time information #1 1113 to #m 1115 . . . Information on each of the cells 1121 to 1124.

Cell time search information 1112 . . . Map information indicating the position (AV address) in which the corresponding cell time information is written when a specific cell ID is specified.

Cell time control general information 1111 . . . Information about all the cell information.

Each piece of cell time information contains cell time general information #m 1116 and cell VOBU table #m 1117 as shown in FIG. 3H.

FIG. 8 illustrates the data structure of the cell time information. It is made up of the cell time control general information 1111 indicating the recording position of each cell 84 of FIG. 7 in the recording/reproducing video data RWVIDEO_OBJECT.VOB (corresponding to the contents of the video object 1012 in FIG. 3D) and the cell time search information 1112 indicating the pieces of LBN (logical block number) information 2011 to 2013 in the place where the cell time information is recorded, in the recording/reproducing video management data RWVIDEO_CONTROL.IFO (corresponding to the data in the control information 1011 of FIG. 3D).

In the cell time control general information 1111, writing is done in the recording position using the AV address. While in FIG. 8, the AV addresses 2002, 2004, 2006 at the begin positions and the respective data sizes 2003, 2005, 2007 are written as the positional information for each cell, the AV addresses 2023, 2025, and 2027 at the end positions are written in place of data size in another example of FIG. 9. The contents of the cell time information recorded in the recording/reproducing video management data RWVIDEO_CONTROL.IFO (the same as the data in the control information 1011 of FIG. 3D) of FIG. 4 are shown in FIG. 20.

Specifically, the cell time general information 1116 indicates general information on each cell. The playback speed 2033 is recorded for each cell, enabling variable speed playback. For example, only the CM portion can be played back at high speed.

Furthermore, the password 2034 and permission 2035 can be recorded in cells, assuring security and enabling parental lock. The contents of the permission setting for each cell are as shown in FIG. 20. Moreover, for the erase level restorable by UNDO like the dustbin on a PC, the user can set erase specify information 2036 or erase/overwrite priority rank information 2037 indicating the order of priority in which erasing is done automatically according to the remaining amount in video recording.

The cell VOBU table 117 of FIG. 20 is used for time codes. Specifically, time codes are expressed by a combination of the number of video frames 2042, 2044, 2046 contained in a cell and the data sizes (the number of sectors used) for the respective individual VOBUs 2041, 2043, 2045. Use of this notation enables a time code to be expressed by a very small amount of information. Hereinafter, an accessing method using the time codes will be explained.

1. The user specifies the desired cell and the time at which the cell is to be accessed.

2. According to the specified time, the MPU of the microcomputer block 30 of FIG. 11 calculates the video frame number from the cell start position of the corresponding video frame.

3. The MPU calculates the cumulative total of the number of video frames 2042 to 2046 for each VOBU from the cell head shown in FIG. 20 and determines which video frame in which VOBU the user-specified video frame falls on, counting from the first VOBU.

4. The recording positions of all the data items in the cell on the information storage medium are determined from the cell time control general information of FIG. 8 or 9.

Using FIGS. 21A to 21D, a detailed explanation of the data structure of the video file and an explanation of an additional recording method by partial erasing or video recording will be given. A block of information recorded continuously for a VOB in a video file on the information storage medium is expressed in extents as with the UDF. In FIG. 21A, each of VOB #1 and VOB #2 is composed of one extent (extent #a and extent #b, respectively)

In FIG. 21A, like the files in the dustbin on the PC, cell D has been specified by the user for erasure. It is deleted from the PGC information of FIG. 10B, so the user cannot see it during playback. However, taking cell D out of the dustbin enables cell D to be registered in the PGC information of FIG. 10B, which enables the user to reproduce it again.

When the first portion of cell B in FIG. 21A is specified by the user for complete deletion, the MPU of FIG. 11, receiving the complete delete range of the portion from the user in the form of time information (as to from what second to what second the portion is deleted completely), refers to the cell VOBU table 1117 of FIG. 20 and determines which VOBU the relevant time range corresponds to.

Next, the VOBU including the boundary time of the complete deletion (the fourth VOBU from the head in cell B corresponds to that VOBU in FIG. 21A) is removed from the objects of complete deletion. By this method, the MPU of FIG. 11 calculates the VOBU to be deleted completely and deletes the relevant portion as shown in FIG. 21B.

Figure 22:
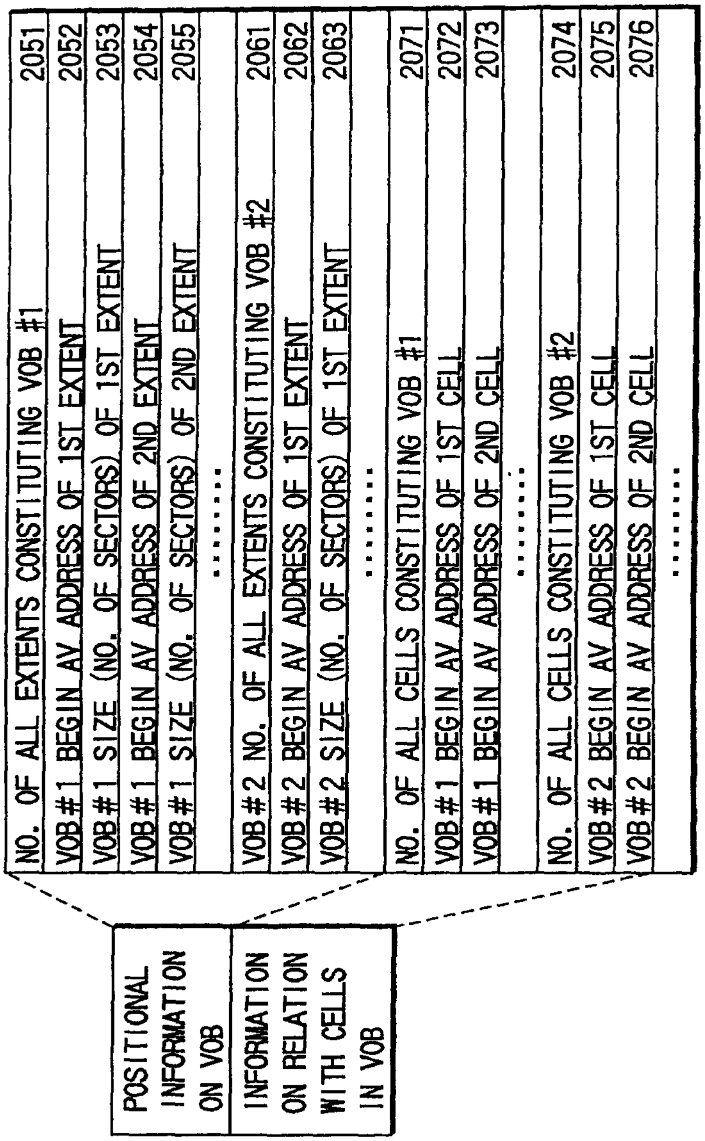
FIG. 22 is a diagram to help explain the details of the data in the VOB control information shown in FIG. 3F.

Thereafter, when receiving information that the user wants to record a very large amount of information additionally, the MPU of FIG. 11 maps all the AV addresses in the video file and deletes the AV addresses for the already recorded portions from the positional information about the VOB of FIG. 22. Then, the addresses for the unrecorded areas are found from the remaining AV addresses. The sizes of all the unrecorded areas are totaled and the result is compared with the additional recording video information size previously specified by the user.

If the totaled size of all the unrecorded areas is insufficient, the delete-specified area is erased completely as shown in FIG. 21C. If the size is still insufficient, the delete/overwrite priority rank information 2037 is read from the cell time general information 1116 of FIG. 20 and deleting is done, starting at the highest level of priority.

As a result, the data in VOB #3 is filled into the blank unrecorded area as shown in FIG. 21D. In FIG. 21D, cell E is divided and recorded in two separate places. In FIG. 21D, the data in VOB #3 is divided into three extents (extent #c, extent #d, extent #e), which are then recorded.

FIG. 22 shows the data structure of the VOB control information 1106 of FIG. 3F. The VOB control information 1106 is made up mainly of the positional information on VOBs and information indicating the relationship between pieces of cell information for each VOB. As shown in FIGS. 21A to 21D, one VOB can be distributed over a video file.

A block of information recorded continuously in a video file in a VOB is expressed by extents as in the UDF. Since the AV address size in the video file is known beforehand, when the positional information on all the VOBs of FIG. 22 is deleted from the mapping of all the AV addresses, the remaining AV addresses are for the unrecorded areas in the video file.

The various operations of the information reproducing apparatus or information recording/reproducing apparatus will be explained.

Processing when the User has Deleted the Recording/Reproducing Video Data by Mistake After an information storage medium (an optical disk 1001) is installed, the information recording/reproducing section 32 reproduces recording/reproducing video management data RWVIDEO_CONTROL.IFO. Thereafter, it retrieves recording/reproducing video data RWVIDEO_OBJECT.VOB, still picture data RWPICTURE_OBJECT.POB, thumbnail picture data RWTHUMBNAIL_OBJECT.POB, and audio data RWAUDIO_OBJECT.AOB on the assumption that the user has deleted the recording/reproducing video data by mistake. If some data item is missing, the DVD video recorder display section 48 is caused to display the message "A specific file is not found."

Video File Size Setting Method at the Beginning

A new information storage medium (an optical disk 1001) is installed for the first time and the information recording/reproducing section 32 reproduces recording/reproducing video management data RWVIDEO_CONTROL.IFO. Finding that recording/reproducing video data RWVIDEO_OBJECT.VOB has not been created, the MPU causes the DVD video recorder display section 48 to display the message "A video recordable area is going to be created. How many hours of video recording do you want to set for standard setting?" and requests the user to answer. On the basis of the answer from the user, the MPU calculates the video file size automatically and registers a file for recording/reproducing video data RWVIDEO_OBJECT.VOB in the UDF.

Address Conversion Between LBN and AV Address is Carried out Using the DMA Information When a DVD-RAM is used as an information storage medium, the DMA area is read and address conversion between LBN and AV address is carried out. A means for reading defect position information from the information storage medium corresponds to the information recording/reproducing section 32 of FIG. 11. A conversion means for effecting address conversion between logical address and AV address from the defective position information obtained by the means for reading defective position information corresponds to the MPU of FIG. 11.

Interlocking Process of UDF and AV Address According to the Video File Size Change As shown in FIG. 19D, as video recording is repeated, the initially set video file size may have to be changed. As a means for creating file system change information according to the video file size change, the MPU of FIG. 11 calculates change information in the UDF. Then, it causes the information recording/reproducing section 32 to record the result of the calculation on the information storage medium (optical disk 1001). The MPU also functions as a means for creating change information on the AV address setting state in the video file according to the file system change information. It causes the information recording/reproducing section 32 to record the created change information in the recording/reproducing video management data RWVIDEO_CONTROL.IFO of FIG. 4 on the information storage medium.

Reallocating Cells/VOB Addresses as a Result of the Video file Size Change

The MPU of FIG. 11 further functions as a means for creating file system change information according to the video file size change. The information recording/reproducing section 32 corresponds to a means for changing (rewriting) at least part of the address information about the cells recorded on the information storage medium or the address information about VOBs according to the file system change information.

Determining the Unrecorded Position on the Disk from the Cell or VOB Address Allocation Information This operation is the same as explained in FIG. 22. A means for reading information on a set of the begin address and cell size for each VOB or each cell or on a set of the begin address and end address from the information storage medium corresponds to the information recording/reproducing section 32 of FIG. 11. A means for extracting the address for the unrecorded area in the video file from the read address information for each VOB or the read address information for each cell corresponds to the MPU.

Executing a Permission Process According to the Permission Setting in Cells or VOBs Video files containing at least video information and management files are recorded on an information storage medium. For the video files, information is recorded in files. The information recorded in the files can be read by playback. The management files have management information about a control method of reproducing the video information recorded in the video files.

The video information in the video files contains blocks of information in cells or VOBs. In the information storage medium, the permission setting information is recorded in the management files in cells or VOBs.

A means for reproducing the permission information from the information storage medium corresponds to the information recording/reproducing section 32. The MPU functions as a display control means for providing display control of reproduced pictures according to the reproduced permission information. In addition, a recording/deleting means for recording and deleting pictures on the basis of the reproduced permission information also corresponds to the MPU.

Changing the Size of Cells or VOBs on the Basis of the VOBU Unit

The MPU of FIG. 11 functions as a first judging means for judging the cell or VOB related to the video portion to be deleted when part of the video information in the video file is deleted. Using the cell VOBU table 1117 of FIG. 20, the MPU judges all the VOBUs constituting the cells or VOBs extracted by the first judging means (MPU).

A first decision means (MPU) and a recording means for changing and recording the recording/reproducing management data by changing the VOBU information constituting the cells or VOBs on the basis of the result from the first decision means (MPU) correspond to the information recording/reproducing section 32 of FIG. 11. The first decision means judges the VOBU corresponding to the picture portion to be deleted and removes from the VOBUs to be deleted the VOBU in which the boundary position of the picture portion to be deleted coincides with the central position. For the cells or VOBs judged by the first judging means (MPU), the first decision means removes the VOBU to be deleted judged by a third judging means (MPU) from the VOBUs constituting the cells or VOBs judged by the second judging means (MPU).

With the embodiment, use of only one video file recordable and reproducible on an information storage medium enables the user to be informed of abnormality at the beginning of or before playback when the user has deleted a video file by mistake. With the conventional DVD video disk which allows more than one video file to exist, when the user has deleted one of the video files by mistake, the information reproducing apparatus or information recording/reproducing apparatus starts playback without sensing the mistake. It does not display the mistake until starting to reproduce the deleted video file. This causes inconvenience to the user. The present invention eliminates this problem.

Each of the information reproducing apparatus and information recording/reproducing apparatus accesses only the video file (RWVIDEO_OBJECT.VOB of FIG. 4) whose file name has been specified in recording and reproducing video information. Therefore, even if the user has put a similar video file (under subdirectory RWV_TS) by mistake, a serious adverse effect can be avoided because each of the information reproducing apparatus and information recording/reproducing apparatus ignores the file.

Only one recordable, reproducible video file is allowed to exist on an information storage medium and all the video information recorded in the video file is set by a single PGC so that all the video information may be reproduced in sequence. This makes it easy for the user familiar with the way of recording a single tape, such as a VTR tape to use the apparatus.

The above method makes it easy to display all the recorded video information in such a manner that all the video information is a string of information like a single tape. Moreover, the method enables the user to operate the apparatus as if to record, delete, or reproduce the data in a specific place on a single tape.

As a result of allowing an unrecorded area to be defined in the video file, the following can be done:

(a) The deleted place can be changed to an unrecorded area without decreasing the video file size, when part of the data in the file is deleted.

(b) Additional data can be recorded in an unrecorded area in the file without changing the total file size.

As a result, the video file size need not be changed each time part of the video information is deleted or additional video information is recorded. This enables the data to be written only in the portion to be changed, such as the deleted place or the additional data recorded place in the unrecorded area, without modifying the portion not to be changed in the video file.

When the contents of a video file of a very large size are changed, the process, related to the invention, of changing the data only in the portion to be changed in the video file shortens remarkably the time required to change the data on the information storage medium, as compared with the conventional method of recording all the files again.

Use of unrecorded areas in a video file and playback sequence information (PGC) about all the video information reproducible in the video file makes it possible to set a video information recording place in the video file on the application software side that processes the video file, independent of the file system (UDF). As a result, a video information recording place can be set according to the playback sequence information (PGC), which makes it easy to record and reproduce the video information continuously.

The file system, such as the UDF or FAT, is allowed to set the recording places (recording addresses: LBNs (Logical Block Numbers)) of the individual files. However, since the UDF or FAT is given only the fine names and file sizes, it allocates sequentially the recording positions of the file sizes given to the blank areas on the information storage medium.

Specifically, since no PGC information is given to the UDF or FAT, recording places suitable for the continues recording or reproducing of video information cannot be set. Giving an unrecorded area in the video file makes it unnecessary to change the video file size when part of the video information is deleted or a small amount of video information is added.

As a result, on the file system, such as the UDF or FAT, the recording place (recording address) of the video file is not changed in adding a small amount of video information or deleting part of the video information. The recording place of the additional video information or the partially deleted place can be managed on the application software side that processes the video file.

Specifically, the application software side tells the file system side, such as the UDF, about the LBNs for the place in which partial deletion or overwriting is to be effected and carries out a partial rewriting process. Having the playback sequence information (PGC) about all the video information reproducible in the video file, the application software side can specify addresses that allow continues recording and reproducing of the video information according to the PGC information.

Only one video file is allowed to exist on an information storage medium and an unrecorded area can be defined in the video file. As a result, even when a video file in which video information is recorded and a computer file in which general computer data is recorded are allowed to exist on the same information storage medium in a mixed manner, the video information can be concentrated and recorded in a specific place on the information storage medium, which makes it easy to record and reproduce the video information continuously.

Consider a case where a video file and a computer file are recorded on the same information storage medium in a mixed manner. Addresses (LBNs) indicating the recording places on an information storage medium for computer files are set on a file system, such as the UDF. As a result, computer files may be scattered over the information storage medium.

Thereafter, when the video file is recorded, the video file may be entered as a collection of extents separated away from each other in such a manner that they are interspersed between the scattered computer files. In the case of the conventional file structure with no unrecorded area in a file, the video file size is changed each time part of the video information in the file is deleted or additional video information is recorded. Whenever the video file size changes, the allocations indicating the recording places on the information storage medium (the distribution of extents in which the video file is recorded) change.

For example, a very-large-sized video file (to the allocation descriptor of whose file entry consecutive addresses are allocated) is created by hours of video recording in such a manner that the video file is localized in one place on the information storage medium. Thereafter, when the middle of the recorded video information is deleted, the partial deletion separates the allocations of the video files into two places on the information storage medium, when the file has no unrecorded area as in the prior art.

Thereafter, PC data may be recorded in the deleted portion. When the video file size is made larger by video recording after the PC data has been recorded in the place, additional video information has to be recorded in a position far away from the recording area of the existing video file on the information storage medium. The interspersing of a single video file in separate positions on the information storage medium has an adverse effect on the continues recording and reproducing of the video information With the present invention, securing an unrecorded area in the same video file prevents the recorded positions of the video file on the information storage medium from interspersing even when partial deletion and additional video recording are repeated. This makes it easy to record and reproduce the video information continuously.

Since the begin address and size information for each cell or VOB are recorded together on an information storage medium, the cell (or VOB) allocation distribution in a video file can be sensed at high speed. As a result, the location of the unrecorded area in the video file can be sensed immediately.

This speeds up a series of video recording start processes of reproducing the management data (RWVIDEO_CONTROL.IFO in FIG. 4), sensing the unrecorded place in the video file, and starting video recording. When each piece of video information is contained in a separate video file as in the example of FIG. 1, there is no unrecorded area in the video file. Only when a method of containing all the video information recorded on an information storage medium in a single video file is used as in the present invention, an unrecorded area appears in the video file and information on the allocation distribution of cells in the video file is needed.

Since the correlation between AV addresses and LBNs changes as the video file size changes, the addresses of the cells and VOBs have to be changed partially. Since the address information about the cells and VOBs recorded in the cell time general information and VOB control information is written as a set of each begin address and size, each begin address has only to be changed when the addresses are changed. This reduces the amount of changed management data items.

In the DVD video disk standard, the begin address and end address for a cell piece are recorded in the video title set cell piece VTS_CPI in the video title set address table VTS_C_ADT. In this case, when addresses are changed, both the begin address and the end address must be changed. With the above method, the cell size or VOB size need not be changed, which reduces the number of changed places by half.

Permission can be set closely in cells or VOBs. In the DVD video disk standard, the parental lock function is carried out on a video title basis or a PGC basis. With the UDF, permission can be set file by file.

With the present invention, since there are a single video file and a PGC covering all the video information on an information storage medium, neither the close setting of permission according to the video information nor the setting of parental lock nor security management can be effected. However, the invention provides permission setting flags for each cell or each VOB, enabling the close setting of permission.

The cell size or VOB size is changed on a VOBU basis as a result of partial deletion of the video information, which makes re-encoding unnecessary. Only the management data (e.g., RWVIDEO_CONTROL.IFO) has to be changed, speeding up the change operation.

Since conventional DVD video disks are for playback only, the cell size or VOB size need not be changed by partial deletion of the video information. Video-recordable information storage mediums of the present invention, however, require the change of the cell size or VOB size. As compared with a case where the VOBU is created again (re-encoded) each time the cell size or VOB size is changed, the method of the present invention enables the cell size or VOB size to be changed easily at high speed.

Since a VOB on the information storage medium can be recorded over a cluster (extent) of one or more video recording areas, the VOB can be recorded over a cluster (extent) of plural blocks of video information in such a manner that it intersperses between the pieces of video information scattered in the video file.

With the data structure of the information storage medium of the invention, since all the video information is recorded in a single video file, pieces of recorded video information are scattered in the video file as video recording and partial deletion are repeated many times. As a result, many small-sized unrecorded areas are scattered in the video file.

When VOBs are recorded in consecutive address areas, places in which large VOBs can be recorded are limited, reducing the recordable capacity of the video file. By enabling a single VOB to be recorded over a cluster (extent) of plural video areas separate from each other in the video file, video recording can be done without wasting many small-sized unrecorded video areas scattered in the file.

FIGS. 23A to 23H illustrate another example of a hierarchical structure of the information recorded on an optical disk 1001 serving as an information storage medium. FIGS. 23A to 23C correspond to FIGS. 3A to 3C explained earlier. The contents of the audio & video data area 1009 in FIG. 23C correspond to those of the audio & video data area 1009 in FIG. 3C as described below.

The navigation data RTR_VMG 2201 in FIG. 23D corresponds to the control information 1011 in FIG. 3D. The movie video recording object RTR_MOV.VRO 2202 in FIG. 23D corresponds to the video object 1012 in FIG. 3D.

The still picture video recording object RTR_STO.VRO 2203 in FIG. 23D corresponds to the picture object 1013 in FIG. 3D. The still picture-added video recording object RTR_STA.VRO 2204 in FIG. 23D corresponds to the audio object 1014 in FIG. 3D.

Neither the maker specification object MSP.VOB 2205 nor other stream object AST.VOB 2206 in FIG. 23D is shown in FIG. 3D. In the explanation, RTR is an abbreviation of real time recording.

The navigation data RTR_VMG 2201 is used to record, reproduce, or edit an AV stream (one or more video object set VOBS). The navigation data RTR_VMG 2201 contains all the necessary navigation data including a single management information file called RTR_IFO.

Specifically, as shown in FIG. 23E, the navigation data RTR_VMG 2201 includes RTR video manager information RTR_VMGI 2210, a movie AV file information table M_AVFIT 2211, a still picture AV file information table S_AVFIT 2212, an original PGC information ORG_PGCI 2213, a user-defined PGC information table UD_PGCIT 2214, a text data manager TXT_DT_MG 2215, and a manufacturer information table MNFIT 2216.

These seven types of information 2210 to 2216 are written in the file RTR_IFO in the order in which they have been described above. Most of the information written in the file RTR_IFO is stored in the RAM of the microcomputer block 30 of FIG. 11.

Figure 24:
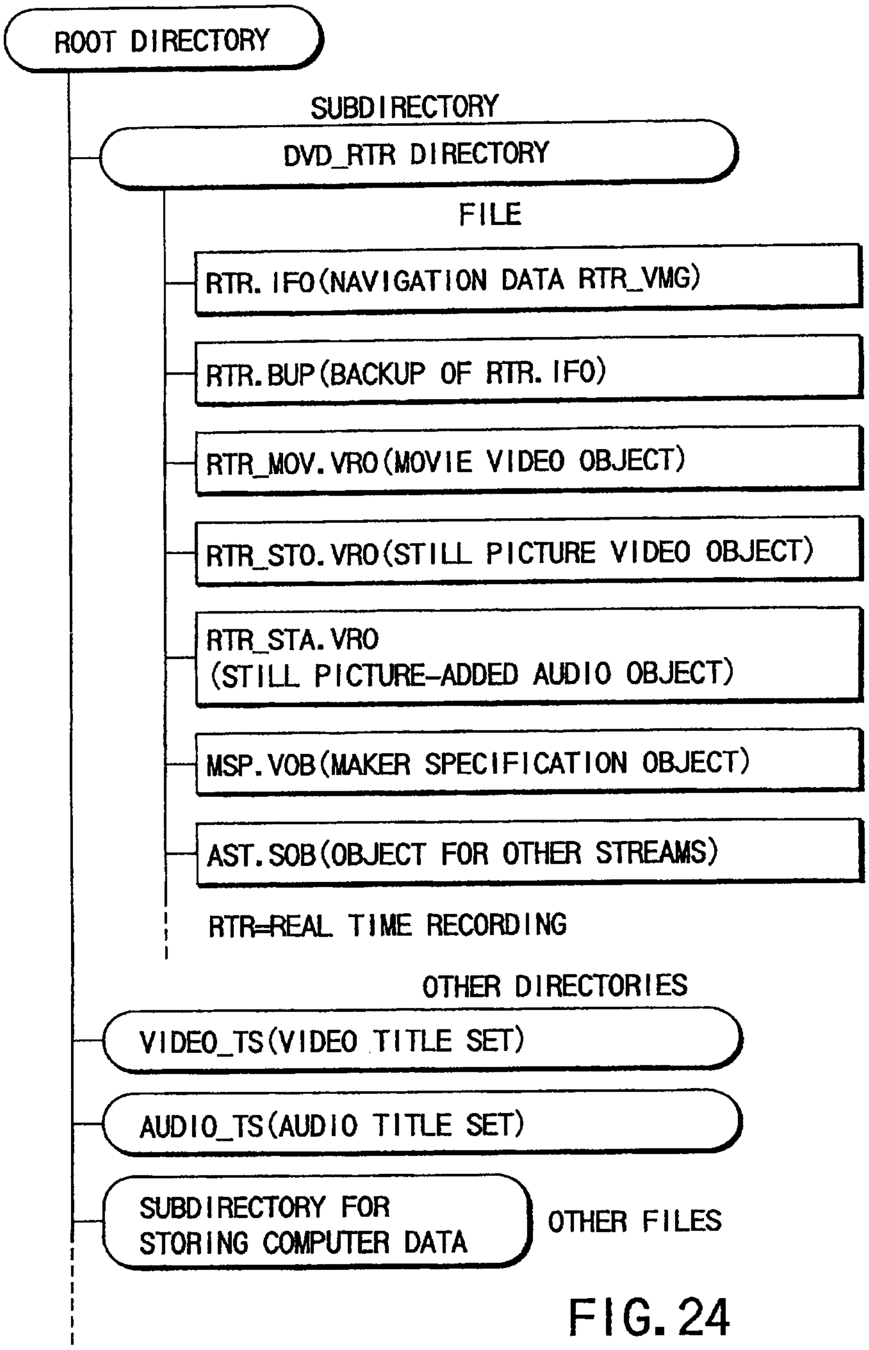
FIG. 24 is a diagram to help explain an example of a directory structure of information (data files) recorded on an optical disk using the data structure shown in FIGS. 23A to 23H.

In the RTR video manager information RTR_VMGI 2210, the basic information (similar information to the video manager information VMGI in the DVD video ROM) on the RTR disk (optical disk 1001) is written. In the movie AV file information table M_AVFIT 2211, a movie AV file corresponding to the movie video recording object RTR_MOV.VRO of FIG. 24 is written.

In accordance with the AV data control information 1101 in the control information 1011 of FIG. 3D, the navigation data RTR_VMG 2201 of FIG. 23D includes a movie AV file information table M_AVFIT 2211.

As shown in FIG. 23F, the movie AV file information table M_AVFIT 2211 includes a movie AV file information table M_AVFITI 2220, one or more pieces of movie VOB stream information M_VOB_STI #1 TO M_MOB_STI #n 2221, and movie AV file information M_AVFI 2222.

In the movie AV file information M_AVFI 2222, information on the movie AV file whose file name is movie video recording object RTR_MOV.VRO is written.

As shown in FIG. 23G, the movie AV file information M_AVFI 2222 includes general information M_AVFI_GI 2230 in the movie AV file information M_AVFI, one or more movie VOB information search pointers M_VOBI_SRP #1 to M_VOBI_SRP #n 2231, and one or more pieces of movie VOB information M_VOBI #1 2232 to M_VOBI #n 2233.

An n number of pieces of movie VOB information M_VOBI #1 2232 to M_VOBI #n 2233 in the movie AV file information M_AVFI 2222 are written in the same order in which the VOB data items stored in the move AV file.

As shown in FIG. 23H, each of the pieces of movie VOB information M_VOBI #1 2232 to M_VOBI #n 2233 includes movie VOB general information M_VOBI_GI 2240, seamless information SMLI 2241, audio gap information AGAPI 2242, and time map information TMAPI 2243. The time map information TMAPI 2243 includes the cell general time information 1116 and cell VOBU table 1117 shown in FIG. 3H.

FIG. 24 shows an example of a directory structure of the information (data file) recorded on an optical disk 1001 using the data structure shown in FIGS. 23A to 23H. Even when the optical disk 1001 and its reproducing apparatus use the data structure shown in FIGS. 23A to 23H, the user cannot see the data structure. The data structure the user can perceive is a hierarchical file structure as shown in FIG. 24.

Specifically, according to the types of data recorded in the data area 1004 of FIG. 23B, the DVD_RTR directory, VIDEO_TS directory, AUDIO_TS directory, and computer data file directories are displayed in the form of menu screens or icons on the root directory screen (not shown).

The DVD_RTR directory of FIG. 24 corresponds to the RWV_TS file of FIG. 4. Under the DVD_RTR directory, the following have been stored: the file RTR.IFO for navigation data RTR_VMG of FIG. 23D, a backup file RTR.BUP for the RTR.IFO, a file RTR_MOV.VRO for the movie video object RTR_MOV.VOB, a file RTR_STO.VRO for the still picture video object RTR_STO.VOB, a file RTR_STA.VRO for the still picture-added audio object RTR_STA.VOB, a file MSP.VOB for the maker specification object, and a file AST.SOB for other stream objects.

The file RTR_IFO shall exists as long as any contents compliant to this specification are recorded. The navigation data is recorded in the file RTR_IFO.

Since the stream data categorized in movie VOB are recorded in the file RTR_MOV.VRO. Therefore, as long as any movie VOB exist, this file shall exist.

The stream data categorized in still picture VOB are recorded in these two files RTR_STO.VRO and RTR_STA.VRO. The file RTR_STO.VRO is used to record original VOBs which consists of a video part including an optional sub-picture unit an optional audio part associated with the video part.

The file RTR_STA.VRO is used to record additional audio part which represents an audio stream recorded in after recording. The audio part recorded in the file RTR_STA.VRO shall be used in combination with some of the video part recorded in the file RTR_STO.VRO.

The file RTR_STO.VRO shall exist as long as any still picture VOB exists, and file RTR_STA.VRO shall exist as long as any additional audio part to be presented with some video part recorded in the file RTR_STO.VRO exists.

Among other PGCs, only original PGC includes stream data stored in the file VRO. Then, only one original PGC shall exist in the disk.

The user-defined PGC is a chain of part of programs. However, it contains only navigation data and each part of program refer to stream data belonging to the original PGC. Therefore, creating or deleting an user-defined PGC does not affect the original PGC at all.

A VOBU is a basic unit of a VOB which consists of one or more GOPs of video data. It has a presentation time period between 0.4 seconds to 1 second is case of movie VOB. In case of still picture VOB, a VOBU contains only one video picture, and the whole VOB becomes a VOBU.

There is an exceptional rule that the last VOBU of a movie VOB may have a presentation time period less than 0.4 seconds period.

A cell in the original PGC is called original cell. A cell in the user-defined PGC is called user-defined cell. The two types of cells are defined each for movie VOB and still picture VOB. When the cell type is for movie VOB, the cells shall only refer to a whole or a part of the movie VOB.

The PGCI is a data structure to represent a total presentation of a PGC. This is used both for the original PGC and user-defined PGC. The user-defined PGC has only PGCI. The cells in the PGCI refer to VOBs in the original PGC. The total presentation of the PGC is described as a presentation sequence of cells defined in the PGCI.

The original PGC consists of PGCI, VOBI, and VOB. The PGCI consists of either one cell or a sequence of more than one cell. Therefore, the total presentation of the original PGC is a sequence of cell presentation. The cell presentation order is the same as the order of which cell information is described in the PGCI.

The most noticeable characteristic of the present invention lies in the original PGC. Specifically, the original PGC shows the procedure of reproducing all the video data items in the RTR_MOV.VRO of FIG. 24 in such a manner that they are linked to each other as if they were a single tape. Moreover, the original PGC contains not only all the video data items in the RTR_MOV.VRO but also all the still picture information in the RTR_STO.VRO and all the additional audio information in the RTR_STA.VRO and shows the playback procedure in such a manner that all the pieces of information are related to each other as if they were an integral single tape. This enables all the data items to be reproduced consecutively.

In order to enable presentation of each cell, the cell information includes VOB numbers, presentation start time, and presentation end time.

In the original PGC, each cell refers to the presentation period of a whole VOB. So presentation start time and presentation end time of a cell becomes equal to the presentation time of the first video picture of the VOB and the presentation time of the last video picture of the VOB, respectively.

In order to access to a VOB recorded in a VOB file, VOBI is used to obtain address information with respect to the file. Especially in order to access to a middle of VOB data when a special play like time search is performed, VOBI includes a time map (TMAP). The TMAP is a conversion table from a given presentation time inside the associated movie VOB to the address of the associated VOBU inside the VOB.

When a VOB is created, it is appended at the end of the VOB file and an associated cell and possibly an associated program is appended at the end of the PGCI.

Figure 25:
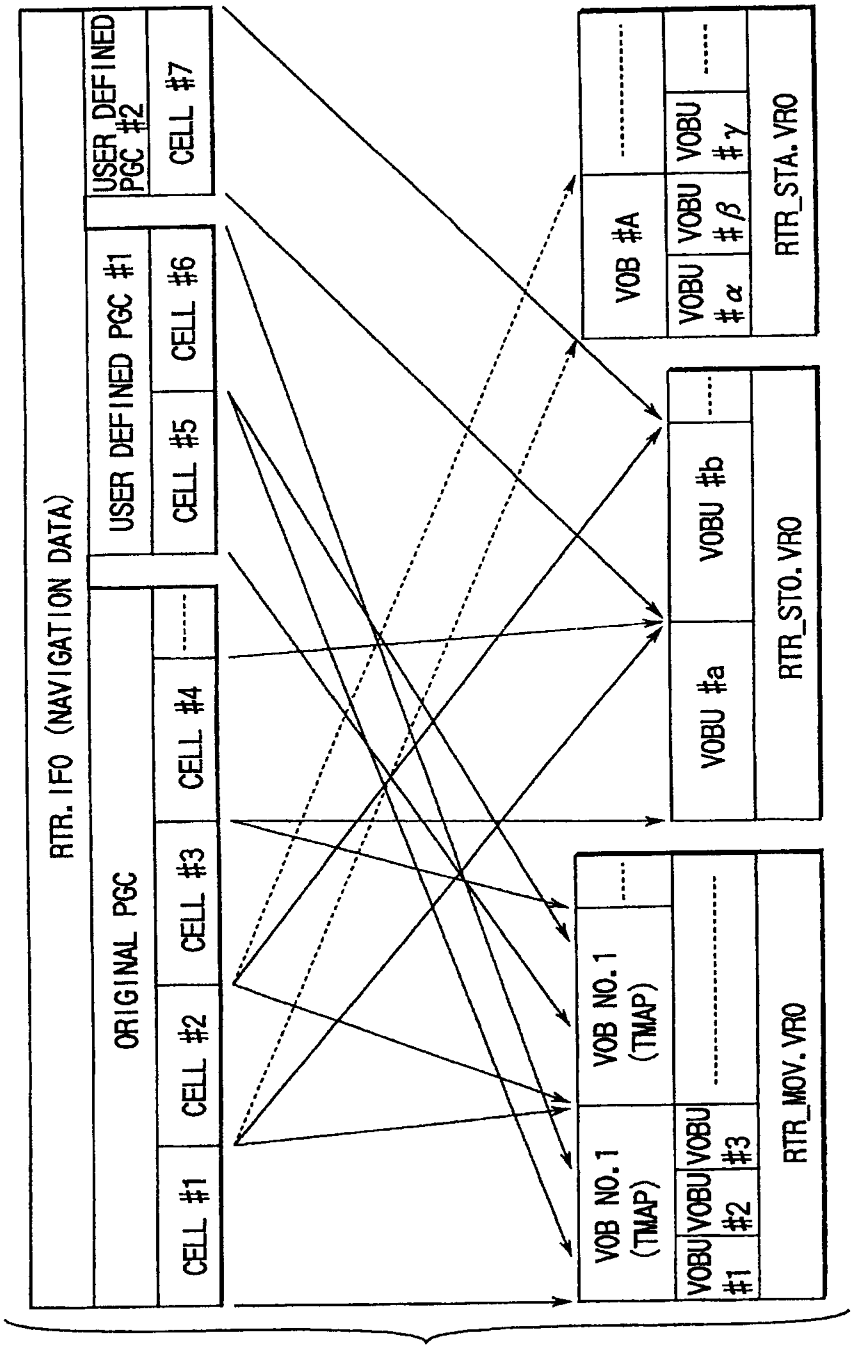
FIG. 25 is a conceptual diagram to help explain a case where a cell playback sequence by the original PGC is changed by a user defined PGC.

FIG. 25 conceptually illustrates a case where the user has changed the cell playback sequence of the contents of the original video recording (original PGC) later, using the user-defined PGC. For example, the video data (video object set VOBS) recorded in the audio & video data area 1009 of FIG. 23C is composed of a collection of one or more program chains PGCs.

Each PGC is a collection of programs made up of one or more cells. In what sequence which cells are to be reproduced to create a program can be determined by the original PGC information ORG_PGCI 2213 or user-defined PGC information table UD_PGCIT 2214 of FIG. 23E. The table TMAP in the time map information TMAPI 2243 of FIG. 23H converts the playback time and playback sequence of the cells specified in the original PGC information ORG_PGCI 2213 or user-defined PGC information table UD_PGCIT 2214 into addresses for VOBUs constituting the cells to be reproduced.

Specifically, when reproducing is done by the original PGC (the cell playback sequence in the initial video recording state), the addresses for the VOBUS for the time zone to be reproduced via the time map information table TMAP are determined on the basis of the contents of the original PGC information ORG_PGCI 2213 of FIG. 23E. Then, reproducing is done in the order of the determined addresses.

On the other hand, when reproducing is done by the user-defined PGC (when the user has edited the playback sequence after video recording), the addresses for the VOBUs for the time zone to be reproduced via the time map information table TMAP are determined on the basis of the contents of the user-defined PGC information table UD_PGCIT 2214 of FIG. 23E. Then, reproducing is done in the order of the determined addresses.

The cell playback sequence by the user-defined PGC information table UD_PGCIT 2214 may be made completely different from the cell playback sequence by the original PGC information ORG_PGCI 2213. The playback time can be correlated to the addresses of the VOBUs to be reproduced, referring to the contents of the time entry and VOBU entry in the time map information TMAPI.

Figure 26:
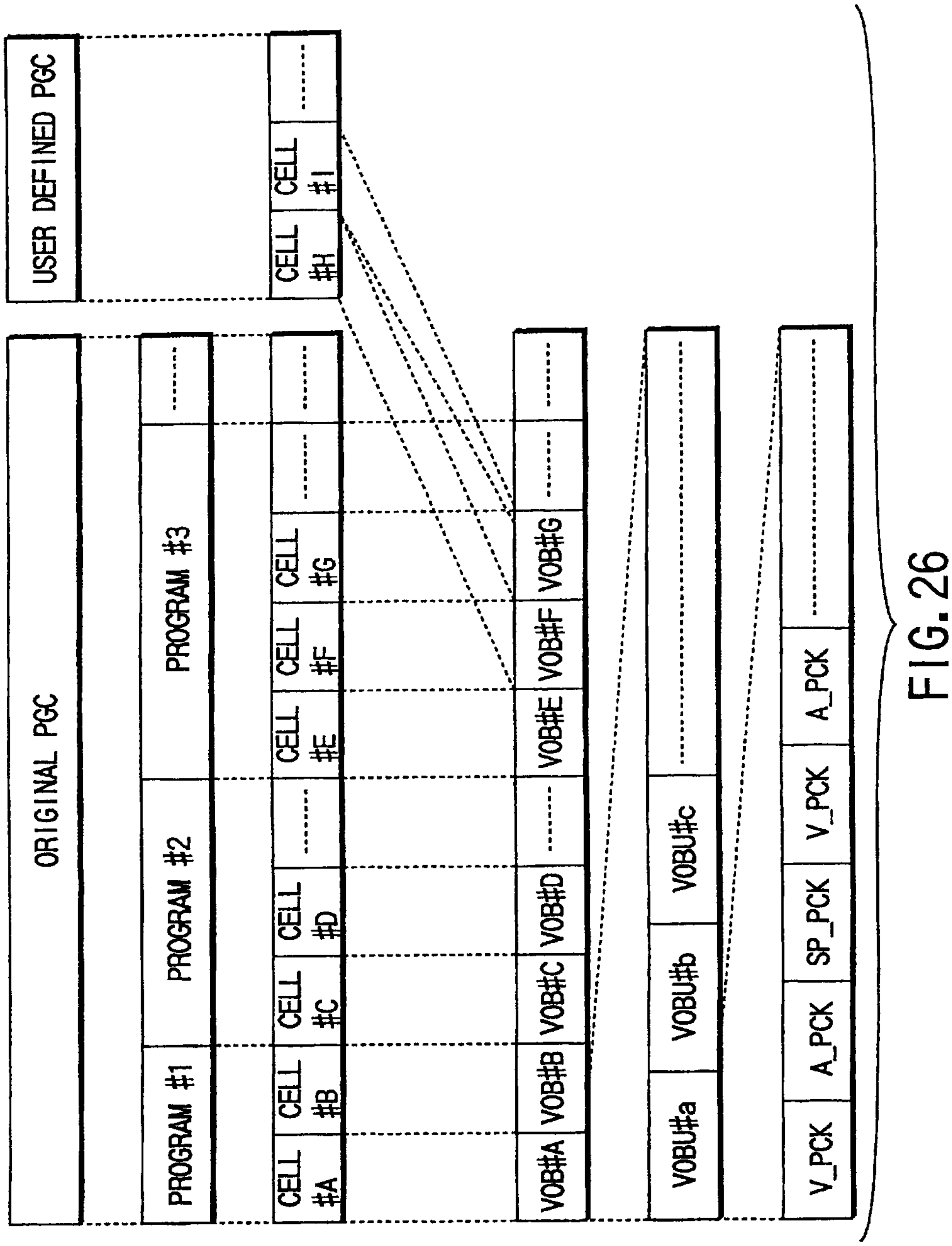
FIG. 26 is a diagram to help explain a case where the original PGC is composed of plural programs.

As shown in FIG. 26, the original PGC can be composed of programs. In this case, for example, programs may be divided into programs differing in video recording time.

The operation of reproducing the original PGC composed of moving pictures proceeds as follows:

1. Obtain file system information by reading the disk and open the files RTR.IFO and RTR_MOV.VRO.
2. Read the entire file RTR.IFO into the memory and examine the PGCI.
3. Examine file system information of the file RTR_MOV.VRO to obtain the file extents where the addresses and sizes regarding the VOB data allocations are described.
4. For each cell in the PCCI starting from one having the earliest cell number, get the VOBI using the VOB number associated with the cell, and find corresponding TMAP in the VOBI in order to convert presentation start time and presentation end time to the address offsets in the file VRD.
5. Start reading the VOB data from the file and perform initial buffering until some amount of the VOB data are buffered in the track buffer. The initial buffering is needed whenever the reading encounters a nonseamless cell boundary.
6. Start decoding the VOB data being buffered in the track buffer and keep reading and decoding until the cell has been completely presented.
7. Loop to step 5 until all of the cells in the original PGC have been completely presented.

Next, the program chain information PGCI contains the navigation information for program chains PGCs. There are two types of program chains defined in this specification, the original PGCs and user-defined PGCs. Original PGC has VOBs as well as PGCI.

However, the user-defined PGC does not have its own VOBs but refer to the VOBs in the original PGC.

Figure 27:
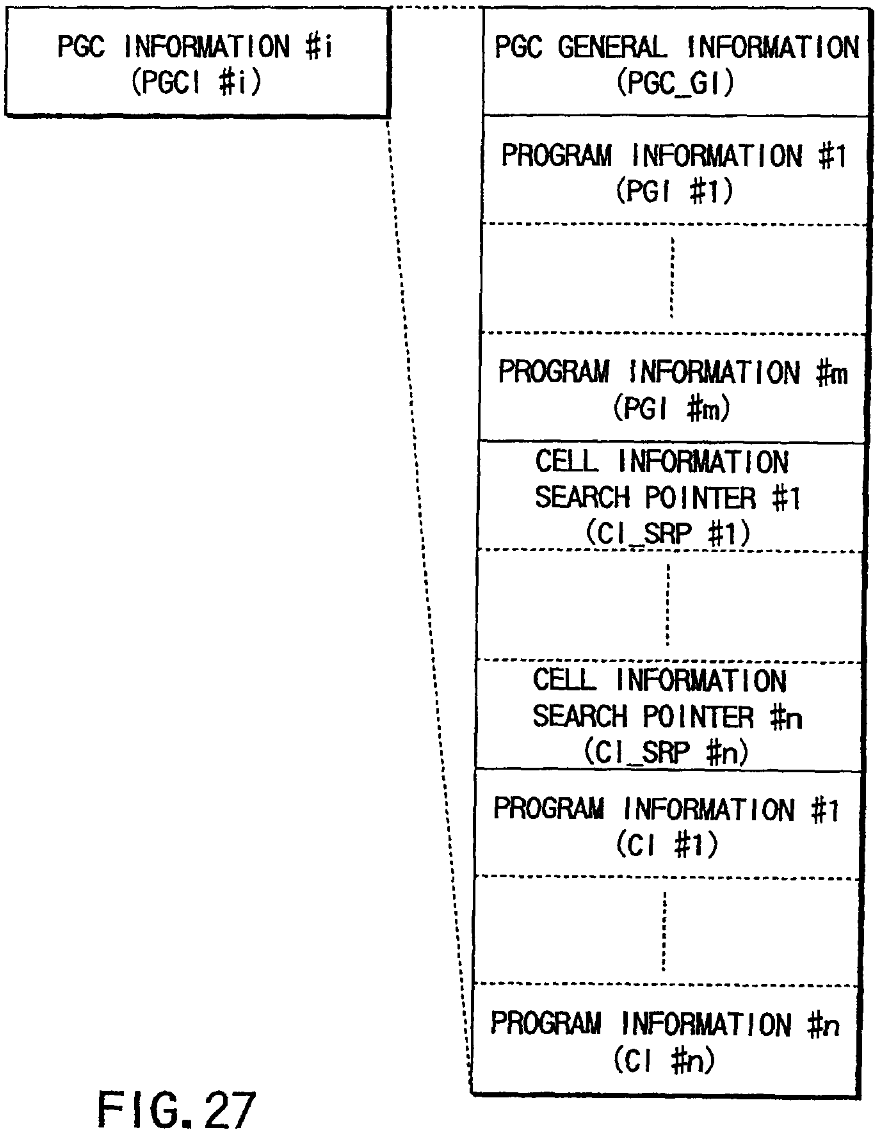
FIG. 27 is a diagram to help explain the PGC information included in the navigation data in FIG. 23D.

As shown in FIG. 27, the program chain information PGGI includes PGC general information PGC_GI, one or more pieces of program information PGI #1 to PGI #m, one or more cell information search pointers CI_SRP #1 to CI_SRP #n, and one or more pieces cell information CI #1 to CI #n.

As shown in FIG. 28, the PGI general information PGC_GI includes one byte of reservation, one byte of PG_Ns, two bytes of CI_SRP_NS. PG_Ns describes the number of programs in the PGC. In user-defined PGCs, 0 is set in PG_Ns. The maximum number of programs in the original PGC is 99. The CI_SRP_Ns describes the number of cell information search pointers in the PGC. The maximum number of cells in the PGC is 999.

As shown in FIG. 29, the program information PGI includes one byte of reservation, one byte of PG_TY, two bytes of C_Ns, 128 bytes of PRM_TXTI, two bytes of IT_TXT_SRPN, and 8 bytes of THM_PTRI.

The PG_TY describes the type of the program. As shown in FIG. 30, when the protect bit b7 is 0, this means that the program is not protected. When the protect bit b7 is 1, this means that the program is protected when a program is in protected state, all the VOBs referred and utilized in the presentation of that program shall not be temporarily or permanently erased. The protect flag shall not be set to 1 unless all the VOBs referred by this program are in normal state.

The C_Ns describes the number of cells in the program.

The PRM_TXTI describes primary text information for the program. The first 64 bytes of the 128 bytes field is used to describing primary text in ASCII character set. If the primary text in ASCII is shorter than 64 bytes, the remaining bytes shall filled with 00 h.

The last 64 bytes of the 128 bytes field is used for describing primary text in another character sets, like so called shift JIS or ISO 8859-15. Another character set code is described in VMGI_MAT and shared by all the primary text information in the disk. The terminal control codes, which take values in the range from 01 h to 11 h, shall not be described in PRM_TXTI.

The IT_TXT_SRPN describes the number of IT_TXT_SRPs in IT_TXT whose text data corresponds to the program.

The THM_PTRI describes thumbnail pointer information. Setting and using the thumbnail pointer information is an optional function for both recorders and players. Recorders which don't have capability to handle this information may set FFh to all eight bytes of THM_PTRI. Players which don't have capability to handle this information may simply ignores the information.

As shown in FIG. 31, the THM_PTRI includes two bytes of CN and six bytes of THM_PT. The CN describes the cell number in which the thumbnail point exists. The THM_PT describes the thumbnail point in the target cell. When the resume marker exists in a movie cell, the THM_PT describes a presentation time PTM.

When the thumbnail exists in a still picture cell, the THM_PT describes the still picture VOB entry number S_VOB_ENTN in the corresponding still picture VOB group S_VOG shown in FIG. 32.

The cell information search pointer CI_SRP of FIG. 27 includes four bytes of CI_SA as shown in FIG. 33. The CI_SA describes the start address of CI with RBN from the first byte in the PGCI.

The cell information CI of FIG. 27 has two types, movie cell information M_CI and still picture information S_CI as shown in FIG. 34.

The movie cell information M_CI is composed of movie cell general information M_C_GI as shown in FIG. 35. As shown in FIG. 36, the movie cell general information M_C_GI includes one byte of reservation, one byte of C_TY, two bytes of M_VOBI_SRPN, two bytes of C_EPI_Ns, six bytes of C_V_S_PTM, and six bytes of C_V_E_PTM.

The C_TY describes the type of the cell. As shown in FIG. 37, 000 b is written in three bits b7 to b5 in the C_TY1 for movie cells. The M_VOBI_SRPN describes the number of movie VOBI search pointers M_VOBI_SRPs related to the movie cells. The C_EPI_Ns describes the number of pieces of cell entry point information C-EPIs.

The C_V_S_PTM describes the playback start time in the PTM description form in the RTR. The C_V_S_PTM and C_V_E_PTM fulfill the following requirements:

(1) In case of a cell in the original PGC, the C_V_S_PTM shall fall into the first four VOBUs of the corresponding VOB and the C_V_E_PTM shall fall into the last four VOBUs of the corresponding VOB.

(2) In case of a cell is in an user-defined PGC, the following relation has to be fuilfilled:

$$O\_C\_V\_S\_PTM \leq C\_V\_S\_PTM \leq C\_V\_E\_PTM \leq O\_C\_V\_E\_PTM$$

where O_C_V_S_PTM and O_C_V_E_PTM are the presentation start time and end time of the original cell which corresponds to the VOB referred by this cell.

The O_V_E_PTM describes the presentation end time of the cell in RTR's PTM describing format.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents

What is claimed:

1. A non-transitory machine readable information recording medium for access by an information reproducing apparatus, the non-transitory machine readable information recording medium comprising:

a first area in which a video file is recorded, the video file including a video object; and a second area including control information, the control information including cell time information, the cell time information describing information relating to the video object, the cell time information including information relating to time code, the control information specifying a first program chain, a second program chain and cells, the first program chain designating first reproduction order of one part of the cells, a first cell of the one part of cells referring first region of the video object, the second program chain information designating second reproduction order of other part of the cells, a second cell of the other part of cells referring second region of the video object, the first region being able to overlap with the second region, the control information including first program chain information representing the first program chain, the first program chain information including first information relating the first cell, the control information including second program chain information representing the second program chain, the second program chain information including second information relating the second cell, the first information and the second information containing information referring to the cell time information, the control information further including address information which indicates a start address of the video object, the video object including a video object unit, the cell time information further including information related to a size of one picture in the video object, the first program chain information including number information relating to the one part of cells, the second program chain information including number information relating to the other part of cells, and the control information including first start time information on the first cell, and second start time information on the second cell, wherein the control information is read and provided to play back the video file by the information reproducing apparatus, and the video file is accessed according to the read control information.

2. An information reproducing method for reproducing information from a non-transitory machine readable information recording medium, the non-transitory machine readable information recording medium having a first area in which a video file is recorded, the video file including a video object, and a second area including control information, the control information including cell time information, the cell time information describing information relating to the video object, the cell time information including information relating to time code, the control information specifying a first program chain, a second program chain and cells, the first program chain designating first reproduction order of one part of the cells, a first cell of the one part of cells referring first region of the video object, the second program chain information designating second reproduction order of other part of the cells, a second cell of the other part of cells referring second region of the video object, the first region being able to overlap with the second region, the control information including first program chain information representing the first program chain, the first program chain information including first information relating the first cell, the control information including second program chain information representing the second program chain, the second program chain information including second information relating the second cell, the first information and the second information containing information referring to the cell time information, the control information further including address information which indicates a start address of the video object, the video object including a video object unit, the cell time information further including information related to a size of one picture in the video object, the first program chain information including number information relating to the one part of cells, the second program chain information including number information relating to the other part of cells, and the control information including first start time information on the first cell, and second start time information on the second cell, the information reproducing method comprising:

reading the control information; and accessing and reproducing the video file based on the read control information.

3. An information recording method for recording information on a non-transitory machine readable information recording medium, the non-transitory machine readable information recording medium having a first area in which a video file is recorded, the video file including a video object, and a second area including control information, the control information including cell time information, the cell time information describing information relating to the video object, the cell time information including information relating to time code, the control information specifying a first program chain, a second program chain and cells, the first program chain designating first reproduction order of one part of the cells, a first cell of the one part of cells referring first region of the video object, the second program chain information designating second reproduction order of other part of the cells, a second cell of the other part of cells referring second region of the video object, the first region being able to overlap with the second region, the control information including first program chain information representing the first program chain, the first program chain information including first information relating the first cell, the control information including second program chain information representing the second program chain, the second program chain information including second information relating the second cell, the first information and the second information containing information referring to the cell time information, the control information further including address information which indicates a start address of the video object, the video object including a video object unit, the cell time information further including information related to a size of one picture in the video object, the first program chain information including number information relating to the one part of cells, the second program chain information including number information relating to the other part of cells, and the control information including first start time information on the first cell, and second start time information on the second cell, the information recording method comprising:

recording a new video object on the non-transitory machine readable information recording medium; and adding new information to the control information.

4. An information reproducing apparatus for reproducing information from a non-transitory machine readable information recording medium, the non-transitory machine readable information recording medium having a first area in which a video file is recorded, the video file including a video object, and a second area including control information, the control information including cell time information, the cell time information describing information relating to the video object, the cell time information including information relating to time code, the control information specifying a first program chain, a second program chain and cells, the first program chain designating first reproduction order of one part of the cells, a first cell of the one part of cells referring first region of the video object, the second program chain information designating second reproduction order of other part of the cells, a second cell of the other part of cells referring second region of the video object, the first region being able to overlap with the second region, the control information including first program chain information representing the first program chain, the first program chain information including first information relating the first cell, the control information including second program chain information representing the second program chain, the second program chain information including second information relating the second cell, the first information and the second information containing information referring to the cell time information, the control information further including address information which indicates a start address of the video object, the video object including a video object unit, the cell time information further including information related to a size of one picture in the video object, the first program chain information including number information relating to the one part of cells, the second program chain information including number information relating to the other part of cells, and the control information including first start time information on the first cell, and second start time information on the second cell, the information reproducing apparatus comprising:

a reading unit configured to read the control information; and an accessing unit configured to access and to reproduce the video object based on the read control information.

* * * * *